United States Patent
Liu

(10) Patent No.: US 11,199,408 B2
(45) Date of Patent: Dec. 14, 2021

(54) COMMUNICATION METHOD AND SYSTEM FOR TRACKING OBJECTS BASED ON COMBINATIONS OF LOCATION RELATIONSHIP

(71) Applicant: Huawei Technologies Co., Ltd., Shenzhen (CN)

(72) Inventor: Yongjun Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 16/360,613

(22) Filed: Mar. 21, 2019

(65) Prior Publication Data

US 2019/0219397 A1    Jul. 18, 2019

Related U.S. Application Data

(63) Continuation of application No. PCT/CN2017/080307, filed on Apr. 12, 2017.

(30) Foreign Application Priority Data

Oct. 26, 2016  (CN) .................. 201610950271.2

(51) Int. Cl.
  *H04W 4/024* (2018.01)
  *G01C 21/00* (2006.01)
  (Continued)

(52) U.S. Cl.
  CPC ............ *G01C 21/005* (2013.01); *G01S 5/02* (2013.01); *H04W 4/02* (2013.01); *H04W 4/023* (2013.01);
  (Continued)

(58) Field of Classification Search
  CPC combination set(s) only.
  See application file for complete search history.

(56) References Cited

U.S. PATENT DOCUMENTS

2003/0146835 A1    8/2003  Carter
2011/0043515 A1 *  2/2011  Stathis .................. 345/419
(Continued)

FOREIGN PATENT DOCUMENTS

CN    104457736 A    3/2015
CN    104535962 A    4/2015
(Continued)

OTHER PUBLICATIONS

Foreign Communication From A Counterpart Application, European Application No. 17866355.5, Extended European Search Report dated Nov. 18, 2019, 13 pages.
(Continued)

*Primary Examiner* — Meless N Zewdu
(74) *Attorney, Agent, or Firm* — Conley Rose, P.C.

(57) ABSTRACT

A location relationship obtaining method includes recording, as a reference location point corresponding to a searched terminal, a location point for obtaining a wireless signal having greatest strength, obtaining at least two reference location points, setting either of the at least two reference location points as a benchmark location point, and obtaining a reference location relationship between the other reference location points and the benchmark location point, where the reference location relationship indicating a location relationship between a searched terminal corresponding to the other reference location points and a searched terminal corresponding to the benchmark location point.

20 Claims, 19 Drawing Sheets

(51) Int. Cl.
*H04W 64/00* (2009.01)
*H04W 4/02* (2018.01)
*G01S 5/02* (2010.01)
*H04W 4/029* (2018.01)

(52) U.S. Cl.
CPC ........... *H04W 4/024* (2018.02); *H04W 4/026* (2013.01); *H04W 4/029* (2018.02); *H04W 64/00* (2013.01)

(56) References Cited

U.S. PATENT DOCUMENTS

| | | | |
|---|---|---|---|
| 2011/0090081 A1 | 4/2011 | Khorashadi et al. | |
| 2011/0117924 A1 | 5/2011 | Brunner et al. | |
| 2011/0288771 A1* | 11/2011 | Mazlum et al. | 701/213 |
| 2012/0072110 A1 | 3/2012 | Venkatraman | |
| 2012/0155302 A1 | 6/2012 | Jeong | |
| 2012/0295635 A1 | 11/2012 | Yokota et al. | |
| 2013/0030692 A1* | 1/2013 | Hagan | 701/410 |
| 2014/0156180 A1 | 6/2014 | Marti et al. | |
| 2014/0256356 A1 | 9/2014 | Shen et al. | |
| 2015/0111598 A1 | 4/2015 | Azami | |
| 2016/0161592 A1* | 6/2016 | Wirola et al. | G01S 5/0252 |
| 2016/0202341 A1* | 7/2016 | Burgess et al. | G01S 5/0252 |
| 2018/0114375 A1* | 4/2018 | Lucas | G07C 1/12 |

FOREIGN PATENT DOCUMENTS

| | | |
|---|---|---|
| CN | 105143822 A | 12/2015 |
| CN | 105628008 A | 6/2016 |

OTHER PUBLICATIONS

Machine Translation and Abstract of Chinese Publication No. CN104457736, Mar. 25, 2015, 14 pages.
Machine Translation and Abstract of Chinese Publication No. CN104535962, Apr. 22, 2015, 18 pages.
Machine Translation and Abstract of Chinese Publication No. CN105628008, Jun. 1, 2016, 19 pages.
Foreign Communication From A Counterpart Application, PCT Application No. PCT/CN2017/080307, English Translation of International Search Report dated Jun. 28, 2017, 2 pages.
Foreign Communication From A Counterpart Application, European Application No. 17866355.5, Partial Supplementary European Search Report dated Jul. 10, 2019, 12 pages.

\* cited by examiner

COMMUNICATION METHOD AND SYSTEM FOR TRACKING OBJECTS BASED ON COMBINATIONS OF LOCATION RELATIONSHIP

CROSS-REFERENCE TO RELATED APPLICATIONS

This application is a continuation of International Patent Application No. PCT/CN2017/080307 filed on Apr. 12, 2017, which claims priority to Chinese Patent Application No. 201610950271.2 filed on Oct. 26, 2016. The disclosures of the aforementioned applications are hereby incorporated by reference in their entireties.

TECHNICAL FIELD

The present disclosure relates to the communications field, and in particular, to a location relationship obtaining method, an object searching method, and a system.

BACKGROUND

Object searching belongs to a common application of positioning and navigation. Some technical means may be used to assist object searching. Generally, if a location of a searched object and a location of a searcher can be determined separately, navigation may be performed with reference to a map to indicate a searching path. The locations may be determined using a positioning technology.

The positioning technology has a wide application prospect in fields such as a shopping guide in a mall, a guide in an underground parking lot, warehouse logistics, and intelligent plants. Some current positioning technologies are based on wireless signal measurement, for example, a positioning technology based on wireless signal strength, a time of flight of a signal, and an angle of arrival of a signal. Some current positioning technologies are based on all types of sensor information, for example, a positioning technology based on an inertial navigation sensor (an accelerometer, a gyroscope, or a magnetometer), a geomagnetic sensor, an optical sensor, a camera, or a voice sensor. In actual positioning application, usually, multiple location information sources are used at the same time to mark a location using multiple positioning technologies.

In an existing positioning technology based on a wireless technology, a large quantity of anchors need to be deployed. The anchors are reference location points or objects whose locations are known. A wireless module is installed on a searched terminal. When searching for an object or a person, a terminal carried by a searcher first scans nearby anchors using a wireless signal to obtain a location of the searcher. At the same time, the searched object scans nearby anchors using a wireless module to obtain a location of the searched object, and sends the obtained location to the searcher using a wireless signal. The searcher computes a navigation path according to the location of the searcher and the received location of the searched object to search for the object or the person.

In other approaches, in a positioning process, a large quantity of reference objects whose locations are known need to be deployed, for example, anchors. Deployment of a large quantity of reference objects whose locations are known is complex, and in addition, deployment and maintenance of the reference objects whose locations are known are at very high costs, greatly increasing positioning costs.

SUMMARY

Embodiments of the present disclosure provide a location relationship obtaining method, a location relationship combining method, an object searching method, a terminal, and a device, to reduce costs of deploying and maintaining anchors whose locations are known.

A first aspect provides a location relationship obtaining method, including detecting, by a collection terminal, wireless signals sent by ambient searched terminals when moving, obtaining a wireless signal that has greatest strength in multiple wireless signals sent by a searched terminal, and recording, as a reference location point corresponding to the searched terminal, a location point for obtaining the wireless signal having the greatest strength, where each searched terminal corresponds to one reference location point, obtaining at least two reference location points, using either of the at least two reference location points as a benchmark location point, and obtaining a reference location relationship between the other reference location points and the benchmark location point, where the reference location relationship includes a distance between the other reference location points and the benchmark location point and an angle of orientation of the other reference location points relative to the benchmark location point, and the reference location relationship is used to indicate a location relationship between a searched terminal corresponding to the other reference location points and a searched terminal corresponding to the benchmark location point.

With reference to the first aspect, in a first possible implementation of the first aspect, the method further includes setting coordinates of the benchmark location point as initial coordinates, and assigning values to the initial coordinates, computing coordinates of the other reference location points based on the reference location relationship and the initial coordinates, generating one location record for one of the reference location points, where the location record includes coordinates of the reference location point and an identifier of a searched terminal corresponding to the reference location point, and forming a location record sequence using all obtained location records.

With reference to the first possible implementation of the first aspect, in a second possible implementation of the first aspect, the method further includes sending, by the collection terminal, the location record sequence to a third party device.

With reference to the first aspect, the first possible implementation of the first aspect, or the second possible implementation of the first aspect, in a third possible implementation of the first aspect, detecting wireless signals sent by ambient searched terminals includes determining, based on a signal ratio, whether a wireless signal received by the collection terminal is a wireless signal sent by the searched terminal.

With reference to the third possible implementation of the first aspect, in a fourth possible implementation of the first aspect, determining, based on a signal ratio, whether a wireless signal received by the collection terminal is a wireless signal sent by the searched terminal includes presetting a signal ratio threshold, determining whether a signal ratio of the wireless signal received by the collection terminal is greater than or equal to the signal ratio threshold, and determining that the wireless signal received by the collection terminal is the wireless signal sent by the searched terminal if the signal ratio of the wireless signal received by the collection terminal is greater than or equal to the signal ratio threshold, or determining that the wireless signal received by the collection terminal is not the wireless signal sent by the searched terminal if the signal ratio is less than the signal ratio threshold.

A second aspect provides a location relationship combining method, including receiving at least two location record sequences, and combining the at least two location record sequences into a location record set in a coordinate system, where the location record set includes coordinates of reference location points corresponding to at least two location records in the coordinate system and identifiers of searched terminals corresponding to the reference location points.

With reference to the second aspect, in a first possible implementation of the second aspect, the location record sequence includes the at least two location records, and is from a collection terminal, a location record includes coordinates of a reference location point and an identifier of a searched terminal corresponding to the reference location point, and the reference location point is a location point for obtaining a wireless signal that has greatest strength from the searched terminal when the collection terminal moves.

With reference to the second aspect or the first possible implementation of the second aspect, in a second possible implementation of the second aspect, combining the at least two location record sequences into a location record set includes configuring an initial location record set, and initializing the initial location record set as an empty set, adding location records in a first location record sequence to the initial location record set to obtain an added location record set, where the first location record sequence is any received location record sequence, performing a first determining process to determine whether a location record of at least one searched terminal exists in both a next location record sequence and the added location record set, combining the next location record sequence and the added location record set into a first intermediate location record set, and updating the added location record set in the first determining process to the first intermediate location record set if the location record of the at least one searched terminal exists in both the next location record sequence and the added location record set, or skip combining the next location record sequence and the added location record set, and saving the next location record sequence into a temporary location record set if the location record of the at least one searched terminal does not exist in the next location record sequence and the added location record set, repeating the first determining process until the determining process is performed for all received location record sequences, and obtaining the location record set.

With reference to the second possible implementation of the second aspect, in a third possible implementation of the second aspect, the method further includes performing a second determining process to determine, by traversing all location record sequences, whether a location record of at least one searched terminal exists in both a location record sequence in the temporary location record set and the location record set, combining the location record sequence in the temporary location record set and the location record set into a second intermediate location record set, and updating the location record set in the second determining process to the second intermediate location record set if the location record of the at least one searched terminal exists in both the location record sequence in the temporary location record set and the location record set, or re-saving the location record sequence in the temporary location record set into the temporary location record set if the location record of the at least one searched terminal does not exist in both the location record sequence in the temporary location record set and the location record set.

With reference to the third possible implementation of the second aspect, in a fourth possible implementation of the second aspect, performing a second determining process further includes performing third determining before performing the second determining, where the third determining includes comparing the location record set with the first intermediate location record set to determine whether a quantity of searched terminals included in the location record set increases, and performing the second determining if the quantity of searched terminals included in the location record set increases, or skip performing the second determining if the quantity of searched terminals included in the location record set does not increase.

With reference to the fourth possible implementation of the second aspect, in a fifth possible implementation of the second aspect, the first intermediate location record set in the comparison with the first intermediate location record set is the first intermediate location record set that exists when the next location record sequence is saved into the temporary location record set for the first time.

With reference to the second possible implementation of the second aspect, the third possible implementation of the second aspect, the fourth possible implementation of the second aspect, or the fifth possible implementation of the second aspect, in a sixth possible implementation of the second aspect, combining the next location record sequence and the added location record set into a first intermediate location record set includes obtaining first coordinates according to coordinates of a searched terminal in the next location record sequence and coordinates in the added location record set, and generating a first location record for the searched terminal, where the first location record includes the first coordinates and an identifier of the searched terminal, the first coordinates indicate coordinates of the searched terminal, and the searched terminal is a searched terminal whose location record exists in both the next location record sequence and the location record set, obtaining second coordinates according to the first coordinates and coordinates of a first remaining searched terminal in the next location record sequence, where the first remaining searched terminal is a searched terminal other than the searched terminal in searched terminals corresponding to the next location record sequence, and generating a second location record for the first remaining searched terminal, where the second location record includes the second coordinates and an identifier of the first remaining searched terminal, and the second coordinates indicate coordinates of the first remaining searched terminal, obtaining third coordinates according to the first coordinates and coordinates of a second remaining searched terminal in the added location record set, where the second remaining searched terminal is a searched terminal other than the searched terminal in the added location record set, and generating a third location record for the second remaining searched terminal, where the third location record includes the third coordinates and an identifier of the second remaining searched terminal, and the third coordinates indicate coordinates of the second remaining searched terminal, and aggregating all the first location record, the second location record, and the third location record into the first intermediate location record set.

With reference to the third possible implementation of the second aspect, the fourth possible implementation of the second aspect, or the fifth possible implementation of the second aspect, in a seventh possible implementation of the second aspect, combining the location record sequence in the temporary location record set and the location record set into a second intermediate location record set includes obtaining fourth coordinates according to coordinates of a searched terminal in the location record sequence in the temporary location record set and coordinates in the location record set, and generating a fourth location record for the searched terminal, where the fourth location record includes the fourth coordinates and an identifier of the searched terminal, the fourth coordinates indicate coordinates of the searched terminal, and the searched terminal is a searched terminal whose location record exists in both the location record sequence and the location record set, obtaining fifth coordinates according to the fourth coordinates and coordinates of a third remaining searched terminal in the location record sequence in the temporary location record set, where the third remaining searched terminal is a searched terminal other than the searched terminal in searched terminals corresponding to the next location record sequence in the temporary location record set, and generating a fifth location record for the third remaining searched terminal, where the fifth location record includes the fifth coordinates and an identifier of the third remaining searched terminal, and the fifth coordinates indicate coordinates of the third searched terminal, obtaining sixth coordinates according to the fourth coordinates and coordinates of a fourth remaining searched terminal in the location record set, where the fourth remaining searched terminal is a searched terminal other than the searched terminal in the location record set, and generating a sixth location record for the fourth remaining searched terminal, where the sixth location record includes the sixth coordinates and an identifier of the fourth remaining searched terminal, and the sixth coordinates indicate coordinates of the fourth remaining searched terminal, and aggregating all the fourth location record, the fifth location record, and the sixth location record into the second intermediate location record set.

A third aspect provides an object searching method, including sending, by a searching terminal, a request for searching for a target searched terminal to a third party device, and detecting a wireless signal sent by an ambient searched terminal, where the target searched terminal is one or more of the searched terminal, receiving a location record set sent by the third party device, where the location record set includes a location record of the searched terminal, and the location record includes coordinates of the searched terminal and an identifier of the searched terminal, obtaining, from the location record set, coordinates indicating the target searched terminal, obtaining, from the location record set, coordinates indicating the searched terminal detected by the searching terminal, computing coordinates of the searching terminal according to the coordinates indicating the searched terminal detected by the searching terminal, or computing coordinates of the searching terminal according to the coordinates indicating the searched terminal detected by the searching terminal and strength of the wireless signal sent by the searched terminal, computing a navigation path according to the coordinates of the searching terminal and the coordinates of the target searched terminal, and searching for the target searched terminal according to the navigation path.

With reference to the third aspect, in a first possible implementation of the third aspect, detecting a wireless signal sent by an ambient searched terminal includes determining, based on a signal ratio, whether a wireless signal received by the searching terminal is a wireless signal sent by the searched terminal.

With reference to the first possible implementation of the third aspect, in a second possible implementation of the third aspect, determining, based on a signal ratio, whether a wireless signal received by the searching terminal is a wireless signal sent by the searched terminal includes presetting a signal ratio threshold, determining whether a signal ratio of the wireless signal received by the searching terminal is greater than or equal to the signal ratio threshold, and determining that the wireless signal received by the searching terminal is the wireless signal sent by the searched terminal if the signal ratio of the wireless signal received by the searching terminal is greater than or equal to the signal ratio threshold, or determining that the wireless signal received by the searching terminal is not the wireless signal sent by the searched terminal if the signal ratio is less than the signal ratio threshold.

With reference to the third aspect, the first possible implementation of the third aspect, or the second possible implementation of the third aspect, in a third possible implementation of the third aspect, the algorithm of computing coordinates of the searching terminal according to the coordinates indicating the searched terminal detected by the searching terminal is a centroid method, the centroid method includes assuming that the coordinates indicating the searched terminal detected by the searching terminal are $(X_i, Y_i)$, the coordinates of the searching terminal are $$\left(\frac{\sum_{i=1}^{n} x_i}{n}, \frac{\sum_{i=1}^{n} y_i}{n}\right).$$

With reference to the third aspect, the first possible implementation of the third aspect, or the second possible implementation of the third aspect, in a fourth possible implementation of the third aspect, the algorithm of computing coordinates of the searching terminal according to the coordinates indicating the searched terminal detected by the searching terminal and strength of the wireless signal sent by the searched terminal is a weighted centroid method, the weighted centroid method includes assuming that the coordinates indicating the searched terminal detected by the searching terminal are $(X_i, Y_i)$, and the strength of the wireless signal sent by the searched terminal is $P_i$ (in decibel-milliwatts (dBm)), the coordinates of the searching terminal are $$\left(\frac{\sum_{i=1}^{n} \frac{x_i}{P_i}}{\sum_{i=1}^{n} P_i}, \frac{\sum_{i=1}^{n} \frac{y_i}{P_i}}{\sum_{i=1}^{n} P_i}\right).$$

A fourth aspect provides an object searching method, including receiving an object searching request sent by a searching terminal for searching for a target searched terminal, where the object searching request includes an identifier of the target searched terminal, obtaining coordinates of the searching terminal, obtaining coordinates indicating the target searched terminal from a location record set, where the location record set includes a location record of the searched terminal, and the location record includes coordinates indicating the searched terminal and an identifier of the searched terminal, computing a navigation path according to the coordinates of the searching terminal and the coordinates of the target searched terminal, and sending the navigation path to the searching terminal.

With reference to the fourth aspect, in a first possible implementation of the fourth aspect, obtaining coordinates of the searching terminal includes computing the coordinates of the searching terminal according to coordinates indicating the searched terminal detected by the searching terminal, or computing the coordinates of the searching terminal according to coordinates indicating the searched terminal detected by the searching terminal and strength of a wireless signal sent by the searched terminal, where the coordinates indicating the searched terminal detected by the searching terminal are obtained from the location record set.

With reference to the first possible implementation of the fourth aspect, in a second possible implementation of the fourth aspect, the algorithm of computing the coordinates of the searching terminal according to coordinates indicating the searched terminal detected by the searching terminal is a centroid method, the centroid method includes assuming that the coordinates indicating the searched terminal detected by the searching terminal are $(X_i, Y_i)$, the coordinates of the searching terminal are $$\left( \frac{\sum_{i=1}^{n} x_i}{n}, \frac{\sum_{i=1}^{n} y_i}{n} \right).$$

With reference to the first possible implementation of the fourth aspect, in a third possible implementation of the fourth aspect, the algorithm of computing the coordinates of the searching terminal according to coordinates indicating the searched terminal detected by the searching terminal and strength of a wireless signal sent by the searched terminal is a weighted centroid method, the weighted centroid method includes assuming that the coordinates indicating the searched terminal detected by the searching terminal are $(X_i, Y_i)$, and the strength of the wireless signal sent by the searched terminal is $P_i$ (dBm), the coordinates of the searching terminal are $$\left( \frac{\sum_{i=1}^{n} \frac{x_i}{P_i}}{\sum_{i=1}^{n} P_i}, \frac{\sum_{i=1}^{n} \frac{y_i}{P_i}}{\sum_{i=1}^{n} P_i} \right).$$

A fifth aspect provides a collection terminal, including a radio frequency (RF) module, a detection module, an inertial navigation sensor module, a processor, a first memory, and a second memory, where the RF module is configured to receive and transmit communication signals, and may be configured to interact with the outside using a wireless packet, the detection module is configured to detect wireless signals around the terminal, the inertial navigation sensor module is configured to measure mobile data of the terminal, where the mobile data includes a distance and an angle of orientation, the processor is configured to run a program using an instruction, the first memory module is configured to store a preset program, the second memory is configured to store data files generated and received by the terminal, the processor is coupled to the first memory, and runs, using an instruction, the preset program stored in the first memory, where the preset program in the first memory receives the instruction of the processor to perform the following steps of detecting, by the collection terminal, wireless signals sent by ambient searched terminals when moving, obtaining a wireless signal that has greatest strength in multiple wireless signals sent by a searched terminal, and recording, as a reference location point corresponding to the searched terminal, a location point for obtaining the wireless signal having the greatest strength, where each searched terminal corresponds to one reference location point, obtaining at least two reference location points, and using either of the at least two reference location points as a benchmark location point, and obtaining a reference location relationship between the other reference location points and the benchmark location point, where the reference location relationship includes a distance between the other reference location points and the benchmark location point and an angle of orientation of the other reference location points relative to the benchmark location point, and the reference location relationship is used to indicate a location relationship between a searched terminal corresponding to the other reference location points and a searched terminal corresponding to the benchmark location point.

With reference to the fifth aspect, in a first possible implementation of the fifth aspect, the further includes setting coordinates of the benchmark location point as initial coordinates, assigning values to the initial coordinates, computing coordinates of the other reference location points based on the reference location relationship and the initial coordinates, generating one location record for one of the reference location points, where the location record includes coordinates of the reference location point and an identifier of a searched terminal corresponding to the reference location point, and forming a location record sequence using all obtained location records.

A sixth aspect provides a server, including at least a communications module, a processor, a first memory, and a second memory, where the communications module is configured to receive and transmit communication signals, and interact with the outside using a wireless packet, the processor is configured to run a program using an instruction, the first memory is configured to store a preset program, the second memory is configured to store data files generated and received by the terminal, the processor is coupled to the first memory, and runs, using an instruction, the preset program stored in the first memory, where the preset program in the first memory receives the instruction of the processor to perform the following steps of receiving at least two location record sequences from a collection terminal, where each location record sequence includes at least two location records, a location record includes coordinates of a reference location point and an identifier of a searched terminal corresponding to the reference location point, and the reference location point is a location point for obtaining a wireless signal that has greatest strength from the searched terminal when the collection terminal moves, and combining the at least two location record sequences into a location record set in a coordinate system, where the location record set includes coordinates of reference location points corresponding to the at least two location records in the coordinate system and identifiers of searched terminals corresponding to the reference location points.

With reference to the sixth aspect, in a first possible implementation of the sixth aspect, combining the at least two location record sequences into a location record set includes configuring an initial location record set, and initializing the initial location record set as an empty set, adding location records in a first location record sequence to the initial location record set to obtain an added location record set, where the first location record sequence is any received location record sequence, performing a first determining process to determine whether a location record of at least one searched terminal exists in both a next location record sequence and the added location record set, and combining the next location record sequence and the added location record set into a first intermediate location record set, and updating the added location record set in the first determining process to the first intermediate location record set if the location record of the at least one searched terminal exists in both the next location record sequence and the added location record set, or skip combining the next location record sequence and the added location record set, and saving the next location record sequence into a temporary location record set if the location record of the at least one searched terminal does not exist in the next location record sequence and the added location record set, repeating the first determining process until the determining process is performed for all received location record sequences, and obtaining the location record set.

With reference to first possible implementation of the sixth aspect, in a second possible implementation of the sixth aspect, the steps further includes performing a second determining process to determine, by traversing all location record sequences, whether a location record of at least one searched terminal exists in both a location record sequence in the temporary location record set and the location record set, and combining the location record sequence in the temporary location record set and the location record set into a second intermediate location record set, and updating the location record set in the second determining process to the second intermediate location record set if the location record of the at least one searched terminal exists in both the location record sequence in the temporary location record set and the location record set, or if the location record of the at least one searched terminal does not exist in both the location record sequence in the temporary location record set and the location record set, re-saving the location record sequence in the temporary location record set into the temporary location record set.

With reference to the second possible implementation of the sixth aspect, in a third possible implementation of the sixth aspect, performing a second determining process further includes performing third determining before performing the second determining, where the third determining includes comparing the location record set with the first intermediate location record set to determine whether a quantity of searched terminals included in the location record set increases, and performing the second determining if the quantity of searched terminals included in the location record set increases, or skip performing the second determining if the quantity of searched terminals included in the location record set does not increase.

With reference to the third possible implementation of the sixth aspect, in a fourth possible implementation of the sixth aspect, the first intermediate location record set in the comparison with the first intermediate location record set is the first intermediate location record set that exists when the next location record sequence is saved into the temporary location record set for the first time.

With reference to the first possible implementation of the sixth aspect, the second possible implementation of the sixth aspect, the third possible implementation of the sixth aspect, or the fourth possible implementation of the sixth aspect, in a fifth possible implementation of the sixth aspect, combining the next location record sequence and the added location record set into a first intermediate location record set includes obtaining first coordinates according to coordinates of a searched terminal in the next location record sequence and coordinates in the added location record set, and generating a first location record for the searched terminal, where the first location record includes the first coordinates and an identifier of the searched terminal, the first coordinates indicate coordinates of the searched terminal, and the searched terminal is a searched terminal whose location record exists in both the next location record sequence and the location record set, obtaining second coordinates according to the first coordinates and coordinates of a first remaining searched terminal in the next location record sequence, where the first remaining searched terminal is a searched terminal other than the searched terminal in searched terminals corresponding to the next location record sequence, and generating a second location record for the first remaining searched terminal, where the second location record includes the second coordinates and an identifier of the first remaining searched terminal, and the second coordinates indicate coordinates of the first remaining searched terminal, obtaining third coordinates according to the first coordinates and coordinates of a second remaining searched terminal in the added location record set, where the second remaining searched terminal is a searched terminal other than the searched terminal in the added location record set, and generating a third location record for the second remaining searched terminal, where the third location record includes the third coordinates and an identifier of the second remaining searched terminal, and the third coordinates indicate coordinates of the second remaining searched terminal, and aggregating all the first location record, the second location record, and the third location record into the first intermediate location record set.

With reference to the second possible implementation of the sixth aspect, the third possible implementation of the sixth aspect, or the fourth possible implementation of the sixth aspect, in a sixth possible implementation of the sixth aspect, combining the location record sequence in the temporary location record set and the location record set into a second intermediate location record set includes obtaining fourth coordinates according to coordinates of a searched terminal in the location record sequence in the temporary location record set and coordinates in the location record set, and generating a fourth location record for the searched terminal, where the fourth location record includes the fourth coordinates and an identifier of the searched terminal, the fourth coordinates indicate coordinates of the searched terminal, and the searched terminal is a searched terminal whose location record exists in both the location record sequence and the location record set, obtaining fifth coordinates according to the fourth coordinates and coordinates of a third remaining searched terminal in the location record sequence in the temporary location record set, where the third remaining searched terminal is a searched terminal other than the searched terminal in searched terminals corresponding to the next location record sequence in the temporary location record set, and generating a fifth location record for the third remaining searched terminal, where the fifth location record includes the fifth coordinates and an identifier of the third remaining searched terminal, and the fifth coordinates indicate coordinates of the third searched terminal, obtaining sixth coordinates according to the fourth coordinates and coordinates of a fourth remaining searched terminal in the location record set, where the fourth remaining searched terminal is a searched terminal other than the searched terminal in the location record set, and generating a sixth location record for the fourth remaining searched terminal, where the sixth location record includes the sixth coordinates and an identifier of the fourth remaining searched terminal, and the sixth coordinates indicate coordinates of the fourth remaining searched terminal, and aggregating all the fourth location record, the fifth location record, and the sixth location record into the second intermediate location record set.

A seventh aspect provides an object searching system, including a searching terminal, a searched terminal, and a server, where the searching terminal is configured to detect a wireless signal sent by the ambient searched terminal, the searching terminal is configured to send an object searching request to the server, where the object searching request carries an identifier of a target searched terminal and a detection result, and the detection result includes an identifier of the searched terminal detected by the searching terminal and strength of the wireless signal, and the server is configured to receive the object searching request, and search for coordinates of the target searched terminal in a location record set, and compute coordinates of the searching terminal according to the identifier of the searched terminal detected by the searching terminal and the strength of the wireless signal, compute a navigation path according to the coordinates of the searching terminal and the coordinates of the target searched terminal, and the server is configured to send the navigation path to the searching terminal.

An eighth aspect provides a system, including a collection terminal, a searched terminal, and a server, where the collection terminal is the collection terminal described in either the fifth aspect or the first possible implementation of the fifth aspect, and the server is the server described in any one of the sixth aspect, the first possible implementation of the sixth aspect, the second possible implementation of the sixth aspect, the third possible implementation of the sixth aspect, the fourth possible implementation of the sixth aspect, the fifth possible implementation of the sixth aspect, or the sixth possible implementation of the sixth aspect.

In the present disclosure, the location point for obtaining the wireless signal having the greatest strength in the wireless signals sent by the searched terminal is recorded as the reference location point corresponding to the searched terminal, the location relationship between the reference location points is used to indicate the location relationship between the corresponding searched terminals, and the location relationship between the searching terminal and the target searched terminal is then determined according to the location relationship between the reference location points such that the location relationship between the searched terminals can be determined when no anchor whose location is known is deployed. A simpler technical solution of positioning is provided.

DESCRIPTION OF EMBODIMENTS

Figure 1:
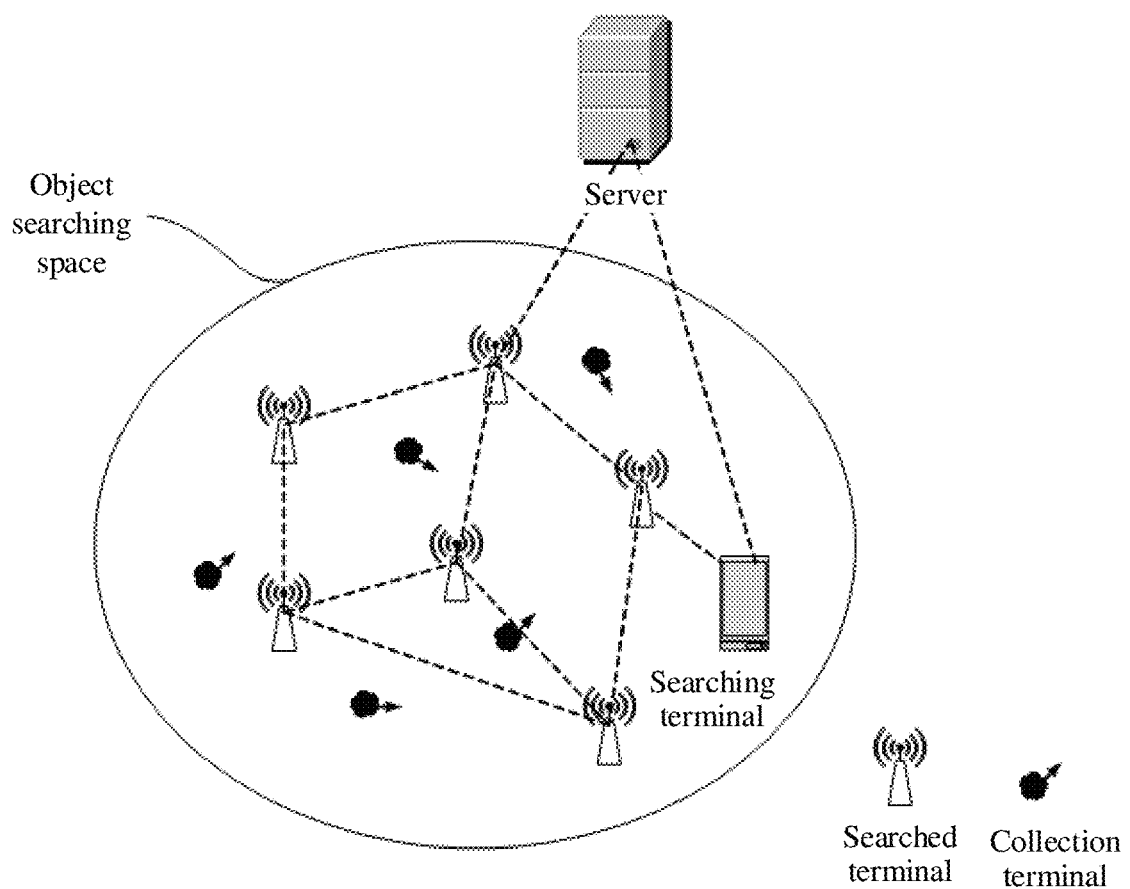
FIG. 1 is a schematic structural diagram of an object searching system according to an embodiment of the present disclosure.

The following clearly describes the technical solutions in some of the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Embodiments of the present disclosure are applicable to space within a particular range, referred to as object searching space. In the object searching space, in addition to an object that a searcher is to search for and that is referred to as a target searched object, there is another object the same as or similar to the target searched object. A location relationship between other objects and a location relationship between another object and the target searched object are relatively stable within a particular time period. Optionally, the other object in the object searching space may be a target searched object of another searcher. To distinguish between the other object in the object searching space and the target searched object in terms of concepts, the other object is referred to as another searched object. The target searched object and the other searched object in the object searching space are collectively referred to as a searched object. For example, a parking lot is object searching space, and all cars parked in the parking lot are searched objects. A car A is a car for which an owner B needs to search. In this case, the car A is a target searched object, and another car is another searched object.

To implement object searching, locations of a searcher and a target searched object need to be determined, and navigation is performed according to the locations of the searcher and the target searched object. A main technology is how to perform positioning, that is, how to determine the locations of the searcher and the target searched object. In an existing positioning technology, for example, a positioning technology based on a wireless technology, a large quantity of anchors need to be deployed. The anchors are nodes or reference objects whose locations are known. Then, the locations of the searcher and the target searched object are determined indirectly according to the locations of the anchors. In the technical solution provided in the embodiments of the present disclosure, a feature that a location relationship between searched objects (including the target searched object) is relatively stable is used, and a location relationship between searched objects is determined based on a wireless signal technology and an inertial navigation measurement technology. Then, a location relationship between the searcher and an ambient searched object is determined. Finally, a location relationship between the searcher and the target searched object can be determined indirectly, thereby implementing navigation. Therefore, the location relationship between the searcher and the target searched object can be determined, that is, the locations of the searcher and the target searched object can be determined, when no anchor whose location is known is deployed.

An embodiment of the present disclosure provides an object searching system. As shown in FIG. 1, the system includes the following key devices.

Searched terminal: a device that is arranged on a searched object (an object, a person, an animal, or the like) and at least can send an identifiable wireless signal. The searched terminal includes a target searched terminal and another searched terminal. Optionally, a device or signal source that has a function of sending an identifiable wireless signal and is static relative to a searched object in object searching space may be used as a searched terminal, for example, a WI-FI device or a BLUETOOTH device. The identifiable wireless signal means that a wireless signal sent by a searched terminal carries a specific identifier, and the specific identifier is referred to as an identifier of the searched terminal.

Collection terminal: a device that has a function of receiving and transmitting wireless signals and is equipped with an inertial navigation sensor group (an accelerometer, a gyroscope, a compass, a barometer, and the like). The collection terminal is configured to obtain a location record sequence indicating a location relationship between searched terminals. A method for obtaining the location record sequence indicating the location relationship is described in detail in the following embodiments. Optionally, the inertial navigation sensor group may be classified into a distance measurement module and an angle of orientation measurement module according to functions. Optionally, a function of the inertial navigation sensor group may be implemented using a hardware combination, or may be implemented using a software module. Optionally, the collection terminal may be a device that is specially configured to obtain a location record sequence indicating a location relationship between searched terminals, or may be a collection terminal, such as a smartphone or a smartwatch, capable of implementing a function of obtaining a location record sequence indicating a location relationship between searched terminals.

Searching terminal: a device carried by a searcher and having a function of receiving and transmitting wireless signals. The searching terminal is configured to exchange data with a server. Optionally, the searching terminal is equipped with an inertial navigation sensor group (an accelerometer, a gyroscope, a compass, a barometer, and the like), may be used as a collection terminal in an object searching process, and is configured to obtain a location record sequence indicating a location relationship between searched terminals. Optionally, if the searching terminal has a relatively great processing capability, the searching terminal may be configured to compute a navigation path based on data sent by the server.

Server: a device that may be configured to receive and process location record sequences from the collection terminal, a request sent by the searching terminal, and data sent by the searched terminal, and combine the location record sequences from the collection terminal into a location record set indicating a location relationship between searched terminals in the object searching space. A method for combining, into the location record set, the location record sequences from the collection terminal and indicating location relationships is described in detail in the following embodiments. Optionally, the server may compute, based on the location record set, a navigation path from the searching terminal to the target searched terminal.

In the object searching system provided in this embodiment of the present disclosure, the searching terminal may interact with the server using a wireless communications technology, optionally, using WI-FI or BLUETOOTH. Optionally, the searched terminal interacts with the server using a wireless technology. An objective of interaction between the searched terminal and the server lies in that if a location record of the searched terminal does not exist in a location record set, the searched terminal needs to send the obtained location record of the searched terminal to the server, or an auxiliary server obtains the location record of the searched terminal and adds the location record to the location record set.

Figure 2:
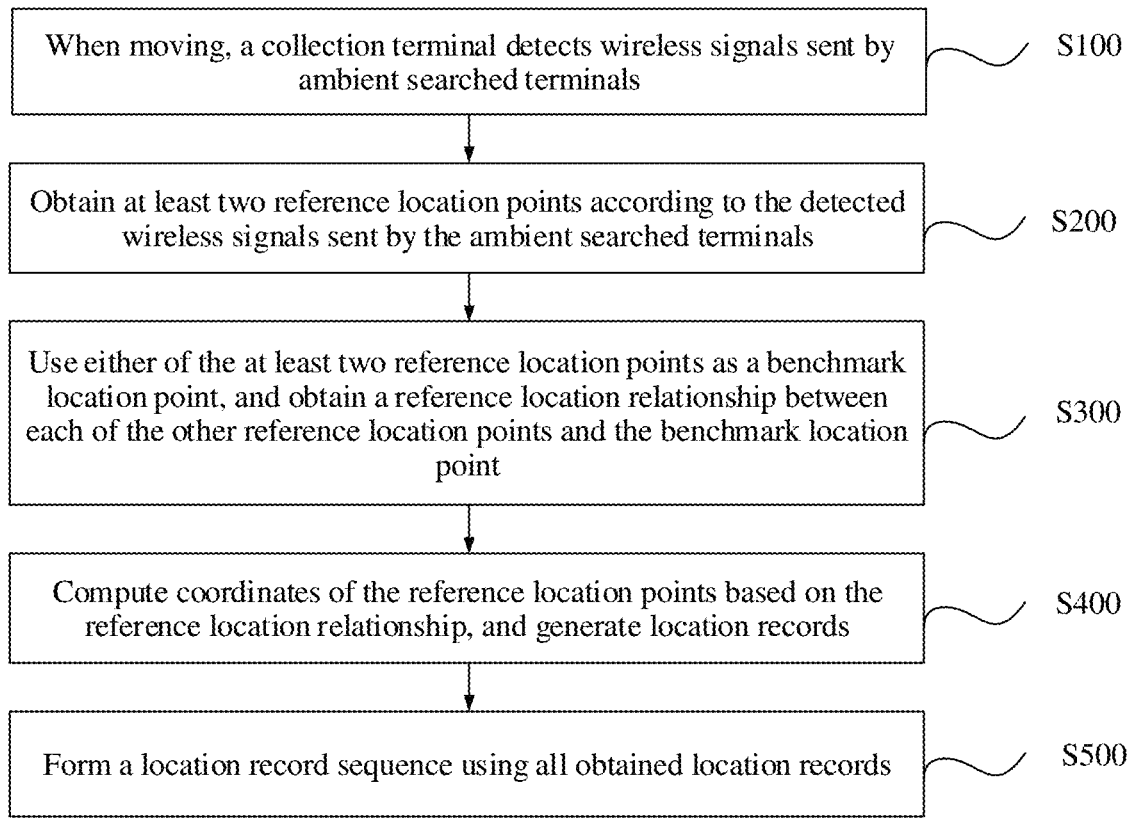
FIG. 2 is a flowchart of a method for obtaining a location record sequence according to an embodiment of the present disclosure.

An embodiment of the present disclosure provides a location relationship obtaining method. As shown in FIG. 2, specific steps are as follows.

Step S100. When moving, a collection terminal detects wireless signals sent by ambient searched terminals.

Step S200. Obtain at least two reference location points according to the detected wireless signals sent by the ambient searched terminals, where each reference location point is a location point for obtaining, by the collection terminal, a wireless signal that has greatest strength in multiple wireless signals sent by a corresponding searched terminal.

Step S300. Use either of the at least two reference location points as a benchmark location point, and obtain a reference location relationship between each of the other reference location points and the benchmark location point, where the reference location relationship includes a distance between each of the other reference location points and the benchmark location point and an angle of orientation of each of the other reference location points relative to the benchmark location point, and the reference location relationship is used to indicate a location relationship between a searched terminal corresponding to each of the other reference location points and a searched terminal corresponding to the benchmark location point.

Step S400. Set coordinates of the benchmark location point as initial coordinates, and assign values to the initial coordinates, compute coordinates of the other reference location points based on the reference location relationship and the initial coordinates, and generate one location record for one of the reference location points, where the location record includes coordinates of the reference location point and an identifier of a searched terminal corresponding to the reference location point.

Step S500. Form a location record sequence using all obtained location records. Optionally, the collection terminal sends the location record sequence to a server.

Optionally, detecting wireless signals sent by ambient searched terminals in step S100 includes determining, based on a signal ratio, whether a wireless signal received by the collection terminal is a wireless signal sent by a searched terminal. Further, determining, based on a signal ratio, whether a wireless signal received by the collection terminal is a wireless signal sent by a searched terminal includes presetting a signal ratio threshold, determining whether a signal ratio of the wireless signal received by the collection terminal is greater than or equal to the signal ratio threshold, and if the signal ratio of the wireless signal received by the collection terminal is greater than or equal to the signal ratio threshold, determining that the wireless signal received by the collection terminal is the wireless signal sent by the searched terminal, or if the signal ratio is less than the signal ratio threshold, determining that the wireless signal received by the collection terminal is not the wireless signal sent by the searched terminal. For example, a preset ratio value is 60%. The collection terminal moves along a straight-line track continuously for 10 seconds, and the collection terminal detects signals once every second. If a detected quantity of times that a signal source sends signals is less than 6, the collection terminal does not process the signal source. If a detected quantity of times that a signal source sends signals is greater than or equal to 6, the collection terminal processes the signal source.

Figure 3:
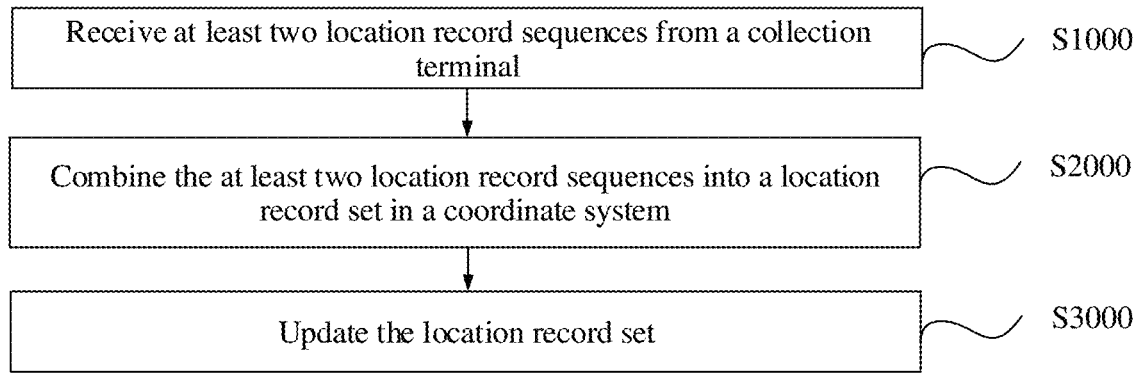
FIG. 3 is a flowchart of a method for combining multiple location record sequences according to an embodiment of the present disclosure.

An embodiment of the present disclosure provides a location relationship combining method, that is, a method for combining multiple received location record sequences into a location record set. As shown in FIG. 3, specific steps are as follows.

Step S1000. Receive at least two location record sequences from a collection terminal, where each location record sequence includes at least two location records, a location record includes coordinates of a reference location point and an identifier of a searched terminal corresponding to the reference location point, and the reference location point is a location point for obtaining a wireless signal that has greatest strength from the searched terminal when the collection terminal moves.

Step S2000. Combine the at least two location record sequences into a location record set in a coordinate system, where the location record set includes coordinates of reference location points corresponding to the at least two location records in the coordinate system and identifiers of searched terminals corresponding to the reference location points.

Step S3000. Update the location record set.

Figure 4:
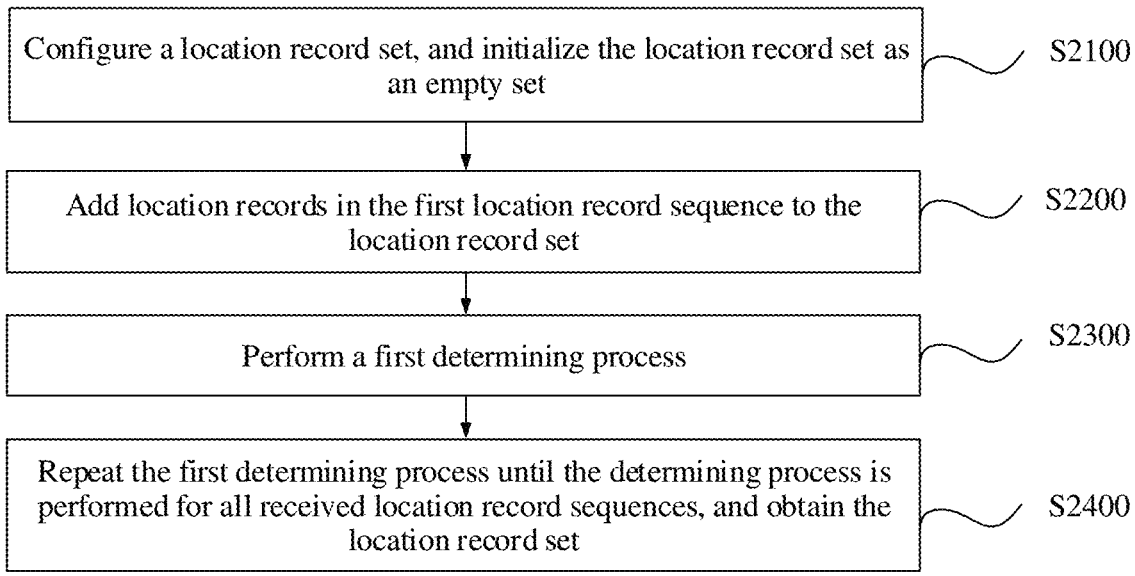
FIG. 4 is a flowchart of a method for combining multiple location record sequences according to an embodiment of the present disclosure.

Further, the method for combining the at least two location record sequences into a location record set in step S2000 is shown in FIG. 4. Specific steps are as follows.

Step S2100. Configure a location record set, and initialize the location record set as an empty set.

Step S2200. Add location records in a first location record sequence to the location record set, where the first location record sequence is any received location record sequence.

Step S2300. Perform a first determining process to determine whether a location record of at least one searched terminal exists in both a next location record sequence and the location record set, and if the location record of the at least one searched terminal exists in both the next location record sequence and the location record set, combining the next location record sequence with the location record set, or if the location record of the at least one searched terminal does not exist in both the next location record sequence and the location record set, save the next location record sequence into a temporary location record set.

Step S2400. Repeat the first determining process until the determining process is performed for all received location record sequences, and obtain the location record set.

Figure 5:
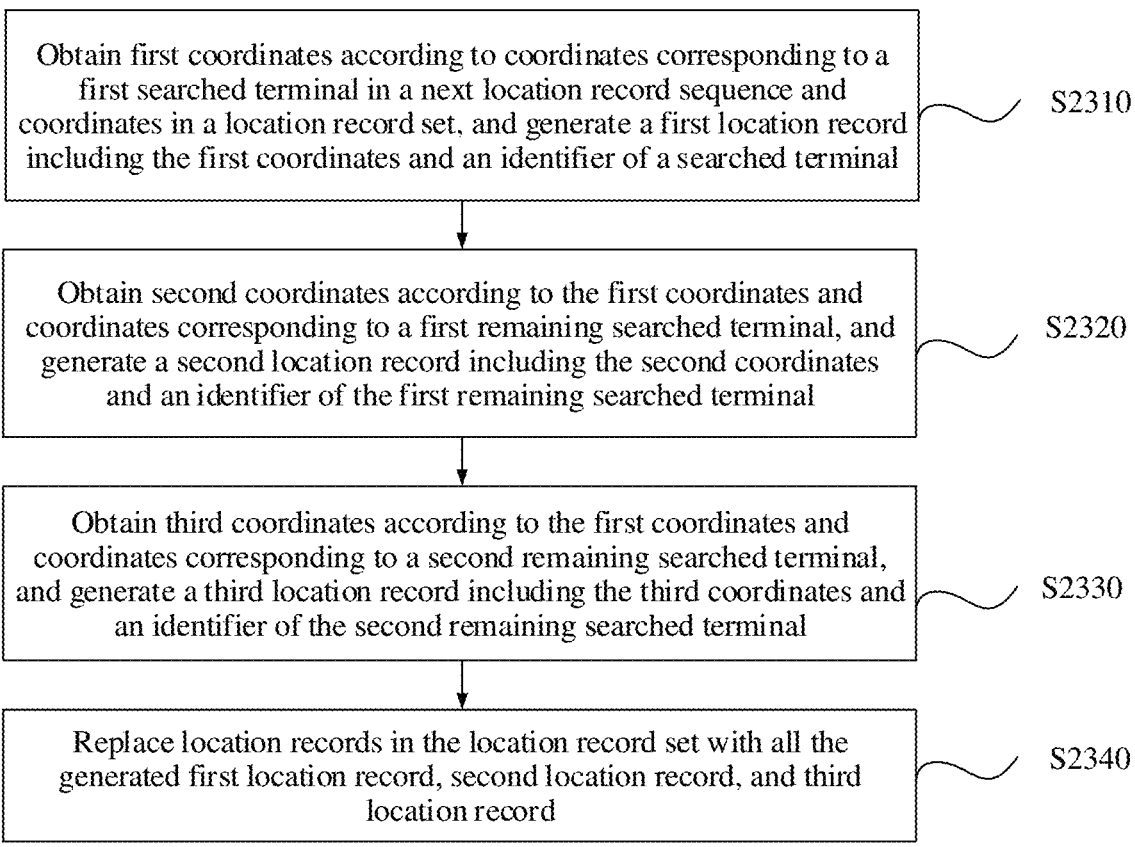
FIG. 5 is a flowchart of a location record obtaining method according to an embodiment of the present disclosure.

Further, the method for combining the next location record sequence with the location record set in step S2300 is shown in FIG. 5. Specific steps are as follows.

Step S2310. Obtain first coordinates according to coordinates corresponding to a first searched terminal in the next location record sequence and coordinates in the location record set, where the first searched terminal is a searched terminal whose location record exists in both the next location record sequence and the location record set, and generate a first location record for the first searched terminal, where the first location record includes the first coordinates and an identifier of the searched terminal.

Step S2320. Obtain second coordinates according to the first coordinates and coordinates corresponding to a first remaining searched terminal, where the first remaining searched terminal is a searched terminal other than the searched terminal in searched terminals corresponding to the next location record sequence, and generate a second location record for the first remaining searched terminal, where the second location record includes the second coordinates and an identifier of the first remaining searched terminal.

Step S2330. Obtain third coordinates according to the first coordinates and coordinates corresponding to a second remaining searched terminal, where the second remaining searched terminal is a searched terminal other than the searched terminal in the location record set, and generate a third location record for the second remaining searched terminal, where the third location record includes the third coordinates and an identifier of the second remaining searched terminal.

Step S2340. Replace location records in the location record set with all the generated first location record, second location record, and third location record.

Figure 6:
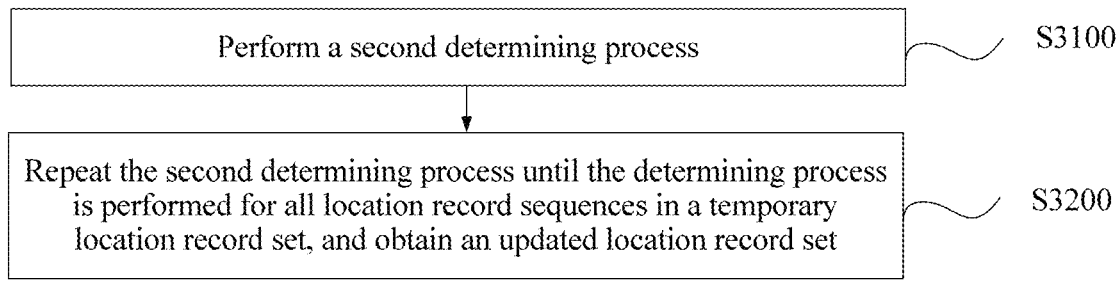
FIG. 6 is a flowchart of a method for updating a location record set according to an embodiment of the present disclosure.

Further, the method for updating the location record set in step S3000 is shown in FIG. 6. Specific steps are as follows.

Step S3100. Perform a second determining process to determine whether a location record of at least one searched terminal exists in both a location record sequence in the temporary location record set and the location record set, and if the location record of the at least one searched terminal exists in both the location record sequence in the temporary location record set and the location record set, combine the location record sequence with the location record set, or if the location record of the at least one searched terminal does not exist in both the location record sequence in the temporary location record set and the location record set, re-save the location record sequence into the temporary location record set.

Step S3200. Repeat the second determining process until the determining process is performed for all location record sequences in the temporary location record set, and obtain an updated location record set.

Figure 7:
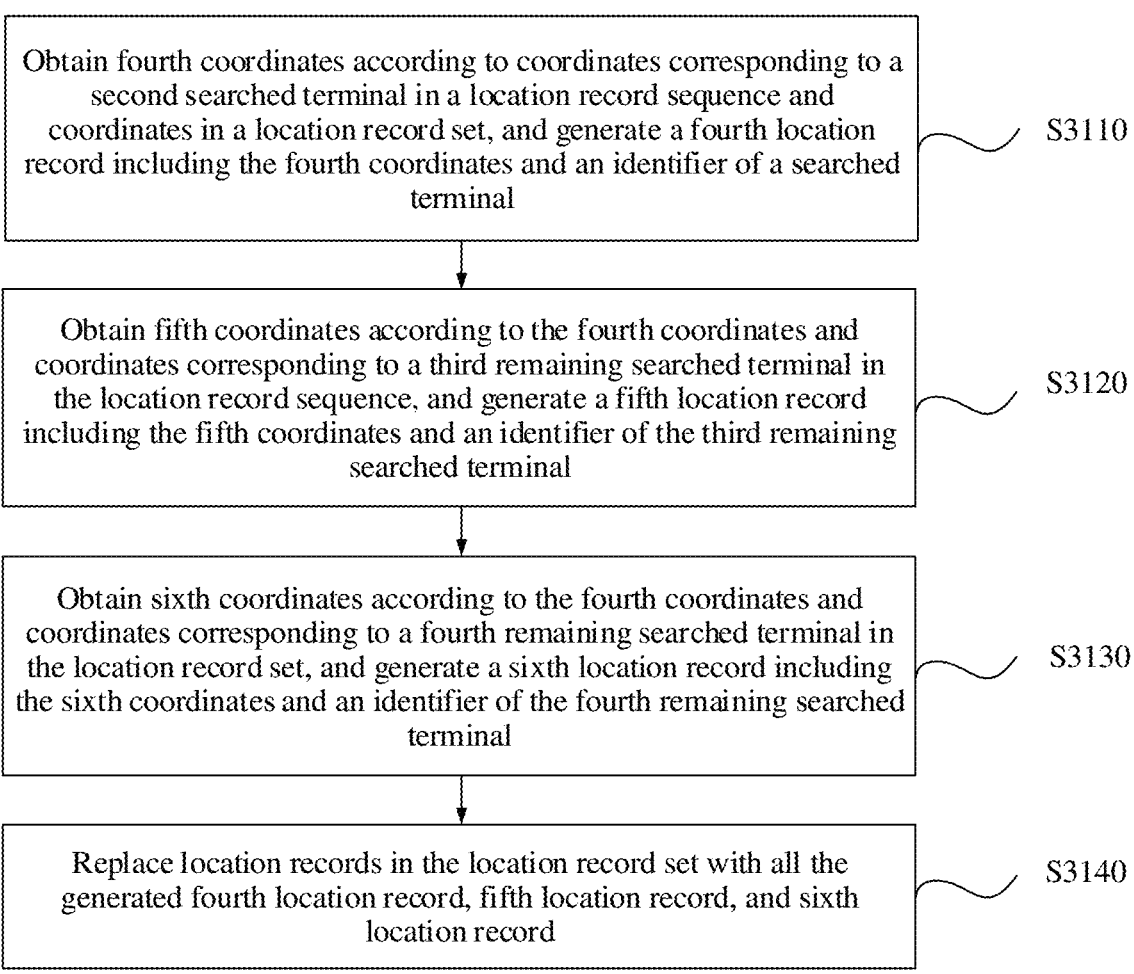
FIG. 7 is a flowchart of a method for updating a location record set according to an embodiment of the present disclosure.

Further, the method for combining the location record sequence with the location record set in step S3100 is shown in FIG. 7. Specific steps are as follows.

Step S3110. Obtain fourth coordinates according to coordinates corresponding to a second searched terminal in the location record sequence and coordinates in the location record set, where the second searched terminal is a searched terminal whose location record exists in both the location record sequence and the location record set, and generate a fourth location record for the second searched terminal, where the fourth location record includes the fourth coordinates and an identifier of the searched terminal, and the fourth coordinates indicate coordinates of the searched terminal.

Step S3120. Obtain fifth coordinates according to the fourth coordinates and coordinates corresponding to a third remaining searched terminal in the location record sequence, where the third remaining searched terminal is a searched terminal other than the searched terminal in searched terminals corresponding to the next location record sequence, and generate a fifth location record for the third remaining searched terminal, where the fifth location record includes the fifth coordinates and an identifier of the third remaining searched terminal.

Step S3130. Obtain sixth coordinates according to the fourth coordinates and coordinates corresponding to a fourth remaining searched terminal in the location record set, where the fourth remaining searched terminal is a searched terminal other than the searched terminal in the location record set, and generate a sixth location record for the fourth remaining searched terminal, where the sixth location record includes the sixth coordinates and an identifier of the fourth remaining searched terminal.

Step S3140. Replace location records in the location record set with all the generated fourth location record, fifth location record, and sixth location record.

Figure 8:
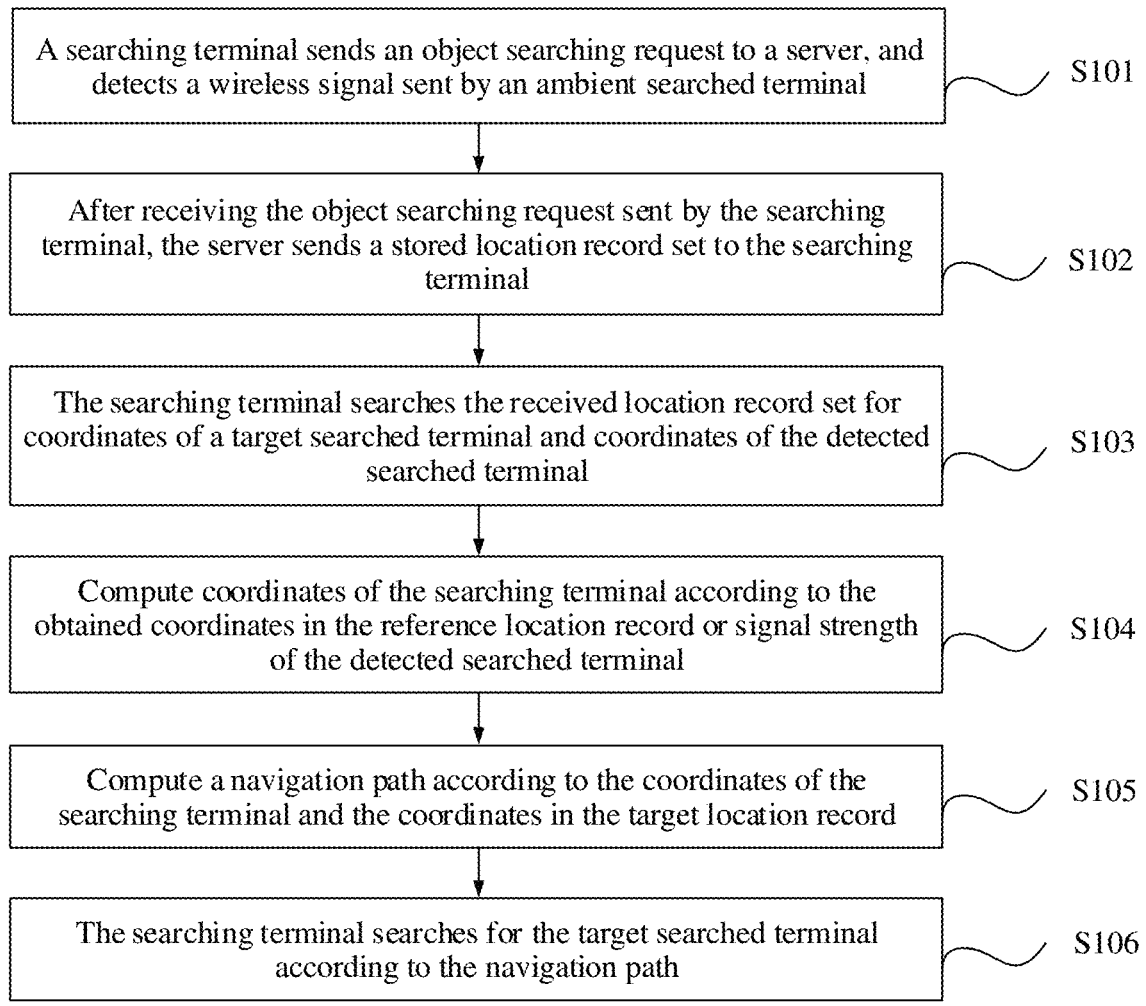
FIG. 8 is a flowchart of an object searching method according to an embodiment of the present disclosure.

An embodiment of the present disclosure provides an object searching method. As shown in FIG. 8, specific steps of the object searching method are as follows.

Step S101. A searching terminal sends an object searching request for searching for a target searched terminal to a server, and detects a wireless signal sent by an ambient searched terminal, where the object searching request is used to trigger the server to send a location record set, the location record set includes at least two location records, a location record includes coordinates of a reference location point and an identifier of a searched terminal corresponding to the reference location point, and the reference location point is a location point for obtaining a wireless signal that has greatest strength from the searched terminal when a collection terminal moves.

Step S102. After receiving the object searching request sent by the searching terminal, the server sends the stored location record set to the searching terminal, where the location record set may be obtained using the method provided in the foregoing embodiment.

Step S103. After receiving the location record set sent by the server, the searching terminal searches the location record set for a target location record, and obtains coordinates in the target location record, where the coordinates may be referred to as coordinates of the target searched terminal, the target location record is a location record including an identifier of the target searched terminal, and searches the location record set for a reference location record, and obtains coordinates in the reference location record, where the reference location record is a location record including an identifier of the searched terminal detected by the searching terminal.

Step S104. Compute coordinates of the searching terminal according to the obtained coordinates in the reference location record, or compute coordinates of the searching terminal according to the coordinates in the reference location record and strength of the wireless signal sent by the searched terminal detected by the searching terminal. A specific method for computing the coordinates of the searching terminal is described in the following embodiment.

Step S105. Compute a navigation path according to the coordinates of the searching terminal and the coordinates in the target location record.

Step S106. The searching terminal searches for the target searched terminal according to the navigation path.

Figure 9:
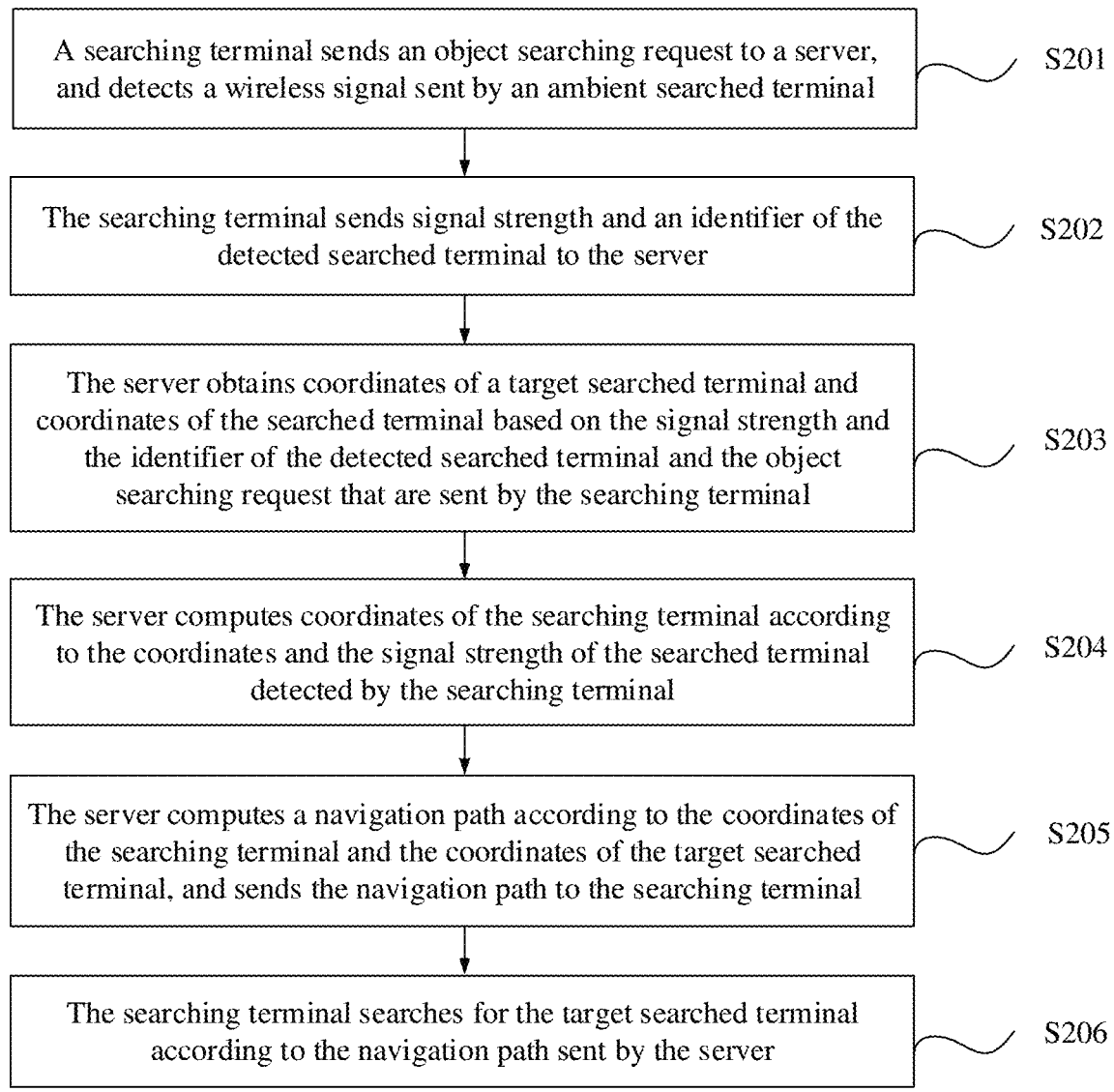
FIG. 9 is a flowchart of an object searching method according to an embodiment of the present disclosure.

When a computing capability of a searching terminal is limited, optionally, a server computes a navigation path and then sends the navigation path to the searching terminal for object searching. An embodiment of the present disclosure provides an object searching method. As shown in FIG. 9, the specific object searching method includes the following steps.

Step S201. A searching terminal sends an object searching request for searching for a target searched object to a server, and detects a wireless signal sent by an ambient searched terminal.

Step S202. The searching terminal sends signal strength and an identifier of the detected searched terminal to the server.

Step S203. The server receives the signal strength and the identifier of the detected searched terminal and the object searching request that are sent by the searching terminal, the server searches a stored location record set for a target location record including an identifier of a target searched terminal and a reference location record including the identifier of the detected searched terminal that is sent by the searching terminal, and separately obtains coordinates in the target location record and coordinates in the reference location record, where the coordinates in the target location record are coordinates indicating a location relationship of the target searched object, and the coordinates in the reference location record are coordinates of the searched terminal that are detected by the searching terminal.

Step S204. The server computes coordinates of the searching terminal according to the coordinates of the searched terminal detected by the searching terminal, or according to the coordinates and the signal strength of the searched terminal detected by the searching terminal. A specific method for computing the coordinates of the searching terminal is described in the following embodiment.

Step S205. The server computes a navigation path according to the coordinates of the searching terminal and the coordinates of the target searched terminal, and sends the computed navigation path to the searching terminal.

Step S206. The searching terminal searches for the target searched terminal according to the navigation path sent by the server.

In this embodiment of the present disclosure, based on an object searching system including a searching terminal carried by a searcher, a searched terminal arranged on a searched object, and a server, using a feature that a location relationship between searched objects is relatively stable, a location relationship is converted into a location record set whose basic elements are coordinates and an identifier, coordinates of a target searched object and coordinates of a searcher can be obtained in the location record set, and a navigation path is computed according to the coordinates of the target searched object and the coordinates of the searcher. Therefore, when no anchor whose location is known is deployed, a location relationship between the searched object and the searcher can be determined, and the target can be found quickly and simply according to a relative location relationship. In the object searching method provided in this embodiment of the present disclosure, no anchor whose location is known needs to be deployed such that costs of deploying and maintaining anchors are reduced.

Based on descriptions of the foregoing embodiment, an embodiment of the present disclosure provides a method for computing coordinates of a searching terminal. A reference location record is a location record that is in a location record set and includes an identifier of an ambient searched terminal detected by the searching terminal. For the location record set, refer to the obtaining method described in the foregoing embodiments.

The method is implemented using two algorithms a centroid method and a weighted centroid method. Specific details are as follows.

1. Centroid method: Computing the coordinates of the searching terminal according to coordinates in the reference location record is as follows. Assuming that the coordinates in the reference location record are $(x_i, y_i)$, the coordinates of the searching terminal are $$\left( \frac{\sum_{i=1}^{n} x_i}{n}, \frac{\sum_{i=1}^{n} y_i}{n} \right),$$

where n is a quantity of the reference location records.

2. Weighted centroid method: Computing the coordinates of the searching terminal according to coordinates in the reference location record and strength of a wireless signal sent by the searched terminal detected by the searching terminal is further as follows. Assuming that the coordinates in the reference location record are $(x_i, y_i)$, and the strength of the wireless signal sent by the searched terminal detected by the searching terminal is $P_i$ (dBm), the coordinates of the searching terminal are $$\left( \frac{\sum_{i=1}^{n} \frac{x_i}{P_i}}{\sum_{i=1}^{n} P_i}, \frac{\sum_{i=1}^{n} \frac{y_i}{P_i}}{\sum_{i=1}^{n} P_i} \right),$$

where n is a quantity of the reference location records.

Figure 10:
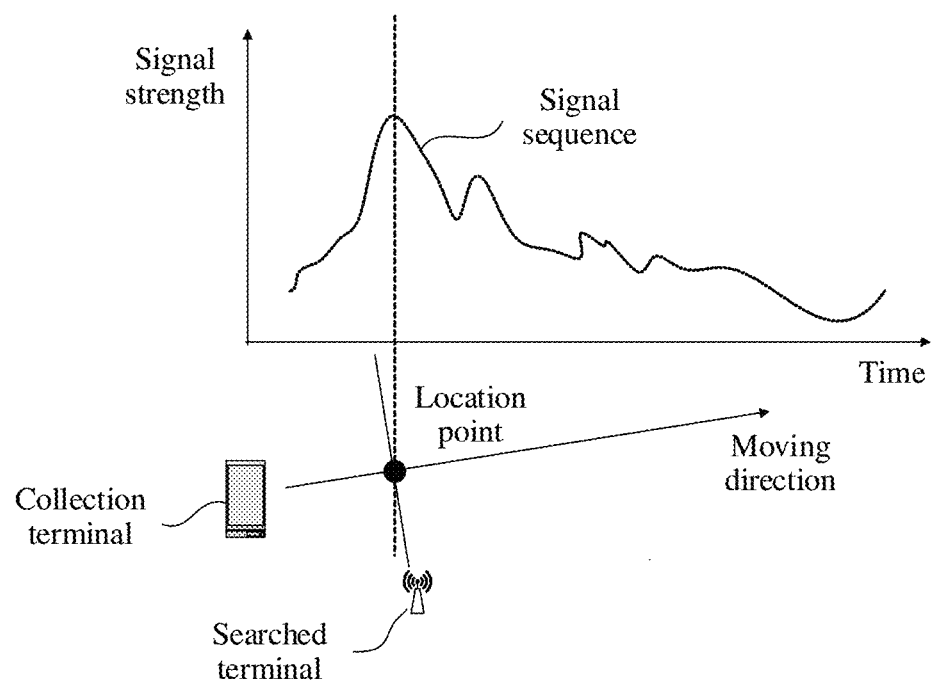
FIG. 10 is a schematic diagram of a location record obtaining method according to an embodiment of the present disclosure.

An embodiment of the present disclosure provides a location relationship obtaining method. As shown in FIG. 10, a collection terminal detects, in a process of moving along a straight-line track, wireless signals sent by ambient searched terminals, and forms a signal sequence using multiple wireless signals that have different strength and that are of a same detected searched terminal. In the moving process, the collection terminal measures, using an inertial navigation sensor group, a distance and an angle of orientation relative to a location point that the collection terminal previously passes through, and may obtain, based on the distance and the angle of orientation that are measured using the inertial navigation sensor group, a location relationship between reference location points that the collection terminal passes through. The reference location point is a location point for detecting, by the collection terminal, a wireless signal that has greatest strength in the signal sequence.

Further, the obtained location relationship between the reference location points is converted into coordinates for representation. A specific method includes setting coordinates of any one of the reference location points as initial coordinates and assigning values to the initial coordinates, and computing coordinates of the other reference location points in a same coordinate system based on the distance and the angle of orientation that are measured using the inertial navigation sensor group.

Further, an identifier of a wireless signal sent by a searched terminal and coordinates of a reference location point corresponding to the searched terminal are used to form a location record of the searched terminal.

Further, location records of multiple searched terminals detected by the collection terminal on the straight-line track are used to form a location record sequence along the straight-line track.

Generally, greater strength of a detected signal indicates a shorter distance between the collection terminal and the searched terminal. When the signal strength is the greatest, according to a geometrical principle, the searched terminal is most possibly on a line that is perpendicular to the straight-line track and passes through a corresponding location point. In this case, a distance between the collection terminal and the searched terminal is the shortest. Based on the foregoing theory, in the technical solution provided in this embodiment of the present disclosure, a location point for obtaining a signal having greatest strength is made in one-to-one correspondence with a searched terminal sending the signal. In this embodiment of the present disclosure, greatest strength in a signal sequence is a relative value. In the signal sequence, a changing trend of the signal strength may be continuously increasing, or continuously decreasing, or increasing first and then decreasing. A signal having greatest relative strength certainly exists in a signal sequence. The signal is a wireless signal having greatest strength in the signal sequence.

In this embodiment of the present disclosure, the location point for obtaining the signal having the greatest strength is made in one-to-one correspondence with the searched terminal sending the signal such that precision of determining a location relationship between searched terminals can be improved.

Figure 11A:
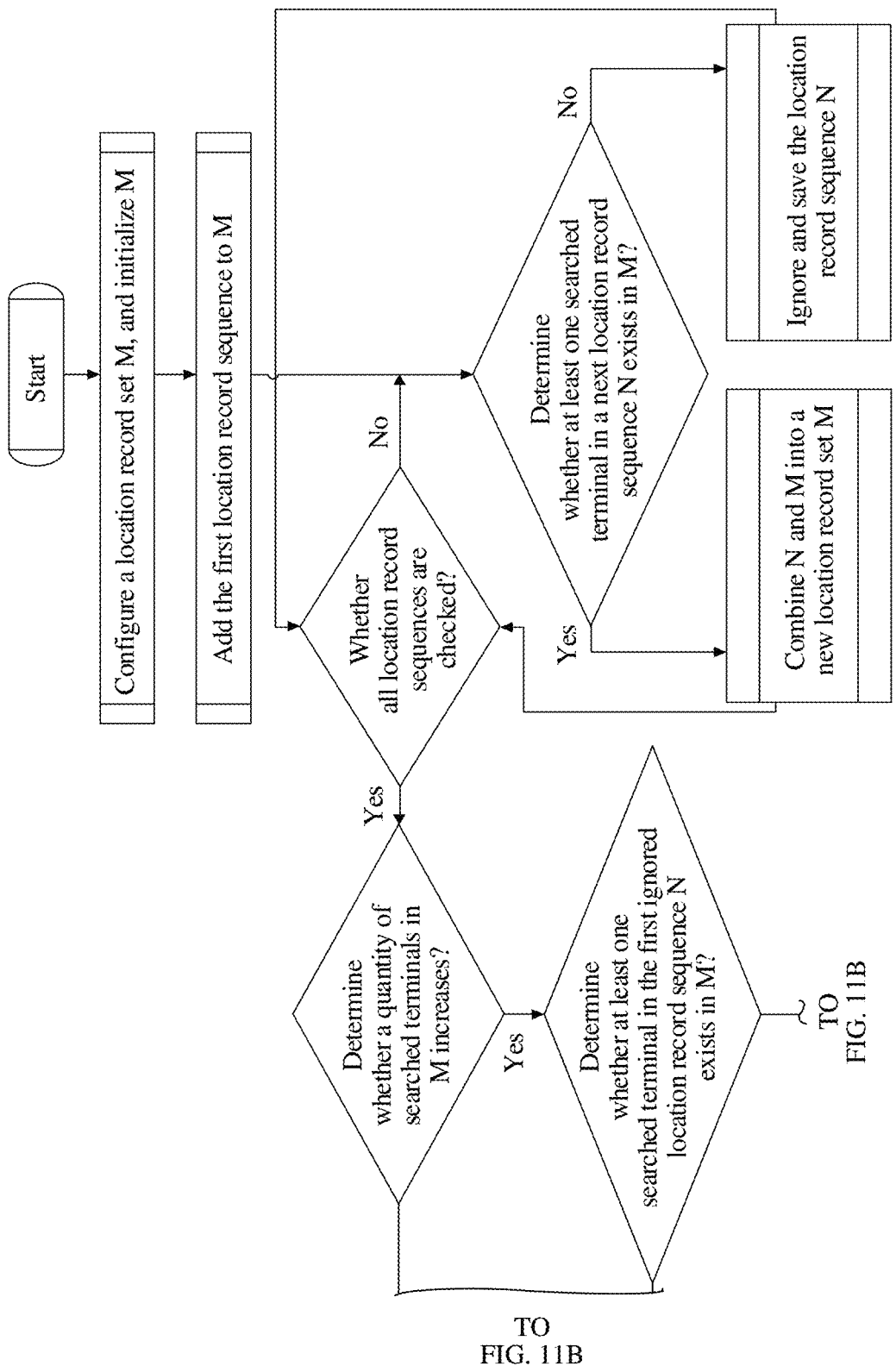
FIG. 11A and FIG. 11B are a schematic diagram of obtaining a location record set according to an embodiment of the present disclosure.
Figure 11B:
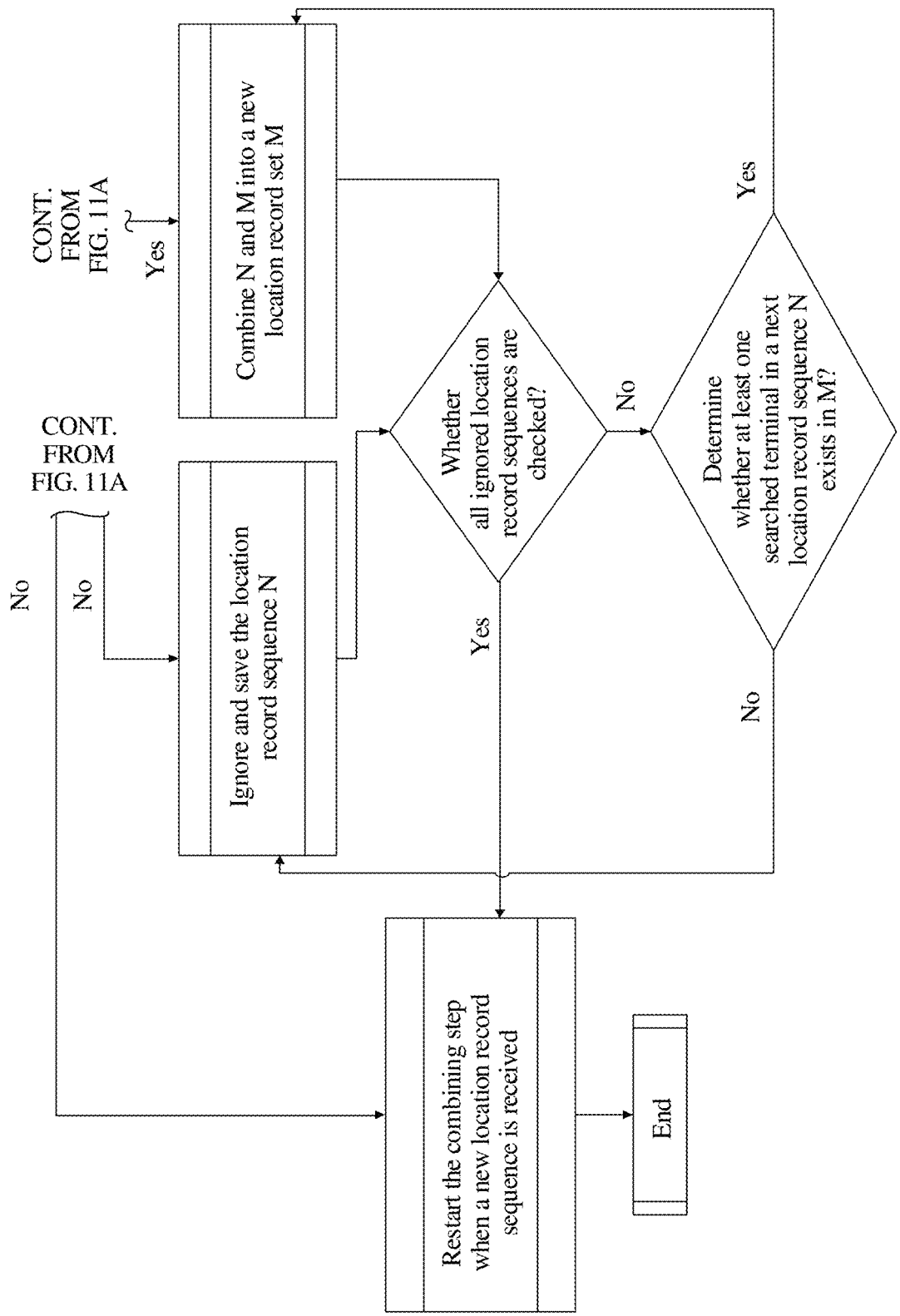

The present disclosure provides a method for combining multiple location record sequences. The location record sequences may be obtained using the method provided in the foregoing embodiment, or may be obtained using another method. As shown in FIG. 11A and FIG. 11B, specific steps are as follows.

Step 1. Configure a location record set M, and initialize M as an empty set.

Step 2. Add the first location record sequence to the location record set M, where the first location record sequence is any location record sequence that is obtained for the first time.

Step 3. Check a next location record sequence, and mark the location record sequence as N.

If a location record of at least one searched terminal in the location record sequence N exists in the location record set M, the location record sequence N and the location record set M are combined into a new location record set M. If no location record of a searched terminal in the location record sequence N exists in the location record set M, the location record sequence N is ignored and saved. That the location record of the searched terminal exists in the location record set M means that the location record of the searched terminal exists in both the location record sequence N and the location record set M. However, coordinates recorded in the two location records may not be the same, and are determined according to corresponding identifiers of the searched terminal in the location records.

Step 3 is repeated until all location record sequences are checked.

Step 4. Determine whether a quantity of searched terminals in the location record set M increases.

If the quantity of searched terminals increases, all location record sequences ignored in step 3 are checked one by one, to determine whether a location record of at least one searched terminal exists in the location record set M. That the location record of the searched terminal exists in the location record set M means that the location record of the searched terminal exists in both the location record sequence N and the location record set M. However, coordinates recorded in the two location records may not be the same, and are determined according to corresponding identifiers of the searched terminal in the location records. If the location record of the at least one searched terminal exists in the location record set M, the location record sequence N and the location record set M are combined into a new location record set M. If no location record of a searched terminal exists in the location record set M, the location record sequence is ignored and saved, and a next location record sequence ignored in step 3 is further checked until all location record sequences ignored in step 3 are checked.

If the quantity does not increase, step 5 is performed.

Step 5. Restart the combining step when a new location record sequence is received.

Further, a specific algorithm of combining the location record sequence N and the location record set M into a new location record set M is as follows.

Assuming that location records of K searched terminals exist in both M and N, coordinates of the K searched terminals in M are (x1, y1, z1), (x2, y2, z2), . . . , (xK, yK, zK), coordinates of the K searched terminals in N are (u1, v1, w1), (u2, v2, w2), . . . , (uK, vK, wK), H searched terminals remaining in M are not in N, and coordinates of the H searched terminals in M are (xx1, yy1, zz1), (xx2, yy2, zz2), . . . , (xxH, yyH, zzH), L searched terminals remaining in N are not in M, and coordinates of the L searched terminals in N are (uu1, vv1, ww1), (uu2, vv2, ww2), . . . , (uuL, vvL, wwL), assuming that coordinates of the K searched terminals in the combined new M are (Xi, Yi, Zi), where i=1 to K, and a $\in$(0, 1), according to Xi=a×xi+(1−a)×ui, Yi=a×yi+(1−a)×vi, and Zi=a×zi+(1−a)×wi, it may be obtained that coordinates of the K searched terminals in the new M are (a×xi+(1−a)×ui, a×yi+(1−a)×vi, a×zi+(1−a)×wi), assuming that coordinates of the H searched terminals remaining in M in the combined new M are (XXp, YYp, ZZp), and p=1 to H, (XXp, YYp, ZZp) is computed to obtain $$\left( \frac{\sum_{i=1}^{K}(X_i - x_i)}{K} + xx_p, \frac{\sum_{i=1}^{K}(Y_i - y_i)}{K} + yy_p, \frac{\sum_{i=1}^{K}(Z_i - z_i)}{K} + zz_p \right) \text{ or}$$

$$\left( \frac{(1-a)}{n}\sum_{i=1}^{K}(u_i - x_i) + xx_p, \frac{(1-a)}{n}\sum_{i=1}^{K}(v_i - y_i) + yy_p, \frac{(1-a)}{n}\sum_{i=1}^{K}(w_i - z_i) + zz_p \right),$$

assuming that coordinates of the L searched terminals remaining in N in the combined new M are (UUq, VVq, WWq), and q=1 to L, (UUq, VVq, WWq) is computed to obtain $$\left( \frac{\sum_{i=1}^{K}(X_i - u_i)}{K} + uu_q, \frac{\sum_{i=1}^{K}(Y_i - v_i)}{K} + vv_q, \frac{\sum_{i=1}^{K}(Z_i - w_i)}{K} + ww_q \right) \text{ or}$$

$$\left( \frac{a}{n}\sum_{i=1}^{K}(x_i - u_i) + uu_q, \frac{a}{n}\sum_{i=1}^{K}(y_i - v_i) + vv_q, \frac{a}{n}\sum_{i=1}^{K}(z_i - w_i) + ww_q \right).$$

The computed coordinates of all searched terminals in the new M are updated to M.

Figure 12:
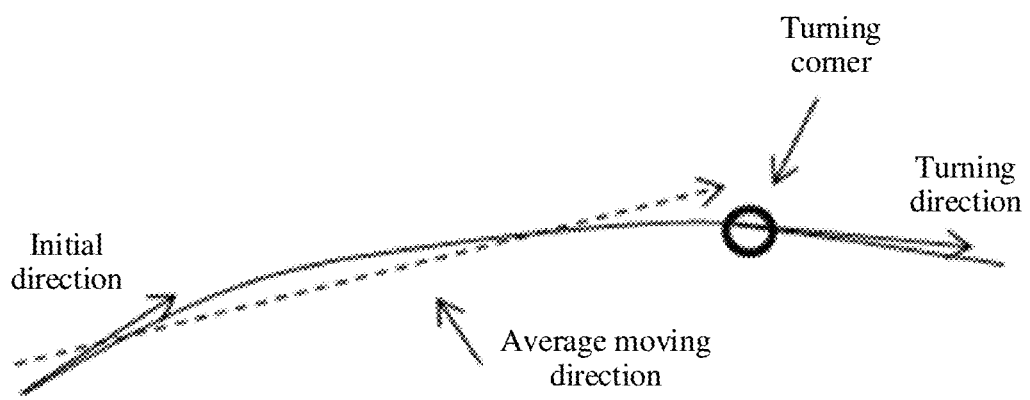
FIG. 12 is a schematic diagram of a straight-line track determining method according to an embodiment of the present disclosure.

Optionally, a weighted value a=W/(W+1), and W is a quantity of added location record sequences in the combining process. Optionally, the weighted value a may be 0.5. An embodiment of the present disclosure provides a method for determining that a collection terminal moves along a straight-line track. As shown in FIG. 12, the method includes the following.

In a moving process, the collection terminal detects a direction change in real time using a configured direction measurement module. Optionally, the collection terminal measures the direction change using an accelerator or a compass. Optionally, the collection terminal performs detection once every second.

Further, the collection terminal presets a direction change threshold. If a direction change detected by the direction measurement module exceeds the preset direction change threshold, it is determined that the collection terminal turns a corner. For example, if the direction measurement module of the collection terminal detects that a direction change, relative to an initial location, of a current location of the collection terminal exceeds 30 degrees, it is determined that the collection terminal turns a corner. The current location is the turning corner, and represents that a previous straight-line track ends and a new straight-line track starts. Optionally, a direction of a straight-line track is determined according to an average value of multiple detection values before the collection terminal turns a corner.

Optionally, in the moving process, although it is determined that the collection terminal does not turn a corner, if an accumulated moving distance of the collection terminal moving from the initial location or from a point at which a previous straight-line track ends reaches or exceeds a preset moving distance threshold, it is determined that the current straight-line movement track ends, and a new straight-line track starts.

In this embodiment of the present disclosure, it is determined, according to the direction change and the moving distance in the moving process, whether the collection terminal moves along a straight-line track such that it can be ensured that the collection terminal moves along the straight-line track, thereby improving accuracy of obtaining, by the collection terminal, a location relationship between searched terminals.

Figure 13:
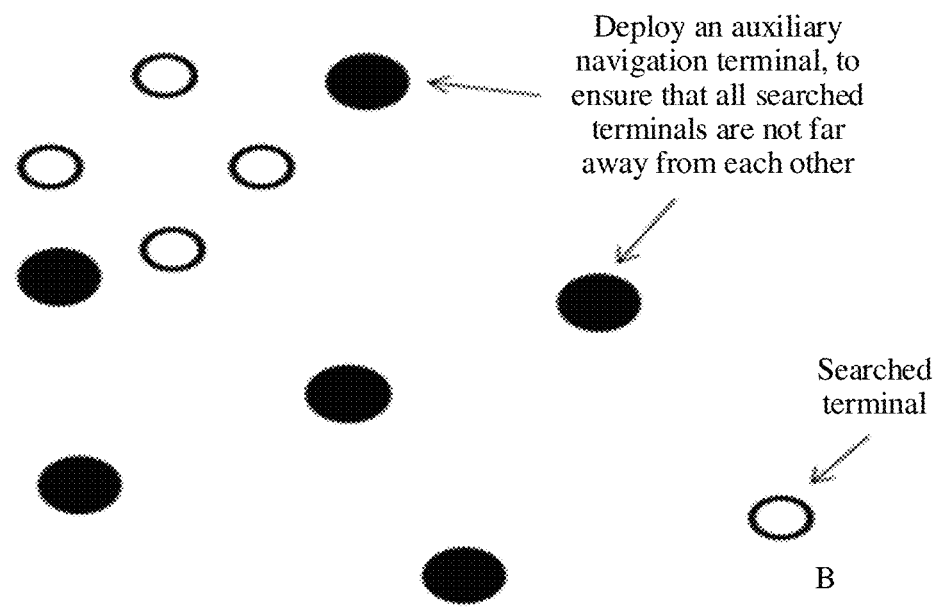
FIG. 13 is a schematic deployment diagram of an auxiliary navigation terminal according to an embodiment of the present disclosure.

A case shown in FIG. 13 may exist in object searching space. A searched terminal B is relatively far away from the other searched terminals. Because a length of a straight-line track is limited, there is a case in which a location record of the searched terminal B cannot be obtained during each detection. An appropriate quantity of auxiliary navigation terminals may be deployed. The auxiliary navigation terminal is in a relatively stable location relationship with the searched terminal, can send an identifiable wireless signal, and is considered as a searched terminal. Optionally, an environment signal source that is static relative to a location of the searched terminal may be used as an auxiliary navigation terminal, and is considered as a searched terminal. The auxiliary navigation terminal is deployed, to ensure that a location relationship between all searched terminals in the object searching space can be obtained.

Figure 14:
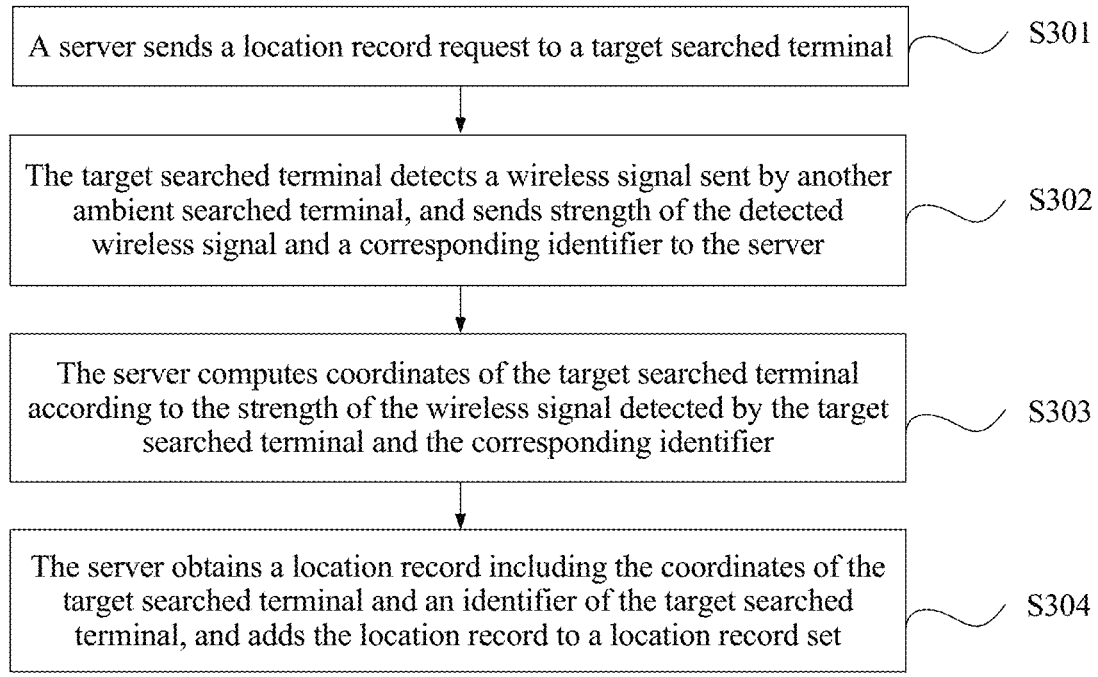
FIG. 14 is a schematic flowchart of a method for obtaining a location record of a target searched object according to an embodiment of the present disclosure.

When a location record including an identifier of a target searched terminal is not found in a location record set, an embodiment of the present disclosure provides a method for obtaining coordinates of a target searched terminal. As shown in FIG. 14, the method is as follows.

Step S301. A server sends a location record request to a target searched terminal.

Step S302. The target searched terminal detects a wireless signal sent by another ambient searched terminal, and sends strength of the detected wireless signal and a corresponding identifier to the server.

Step S303. The server computes coordinates of the target searched terminal according to the strength of the wireless signal detected by the target searched terminal and the corresponding identifier. For a specific computation method, refer to the methods for computing coordinates of a searching terminal in the foregoing embodiment, that is, a centroid method and a weighted centroid method.

Step S304. Further, the server obtains a location record including the coordinates of the target searched terminal and an identifier of the target searched terminal, and adds the location record to a location record set. For the location record set, refer to the descriptions in the foregoing embodiments.

In this embodiment of the present disclosure, the coordinates of the target searched terminal are computed according to coordinates of the other searched terminal detected by the target searched terminal such that the location record of the target searched terminal can be obtained when the location record of the target searched terminal does not exist in the location record set.

Figure 15:
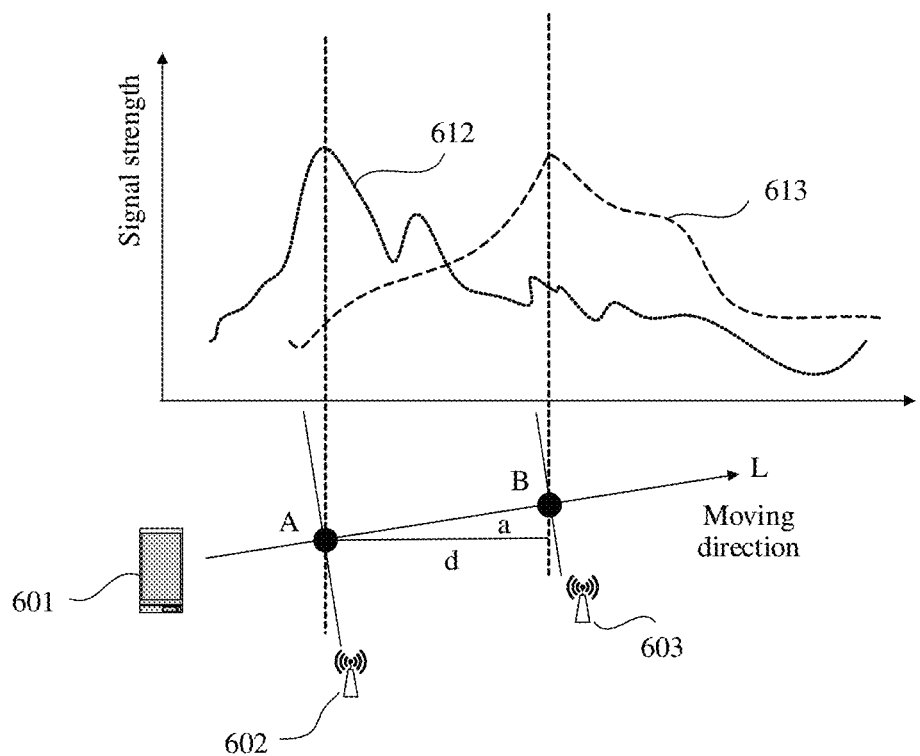
FIG. 15 is a schematic diagram of a method for obtaining a location record sequence according to an embodiment of the present disclosure.

An embodiment of the present disclosure provides a method for obtaining a location record sequence. As shown in FIG. 15, the specific method is as follows.

A searched terminal 602 and a searched terminal 603 exist in object searching space, and actual locations of the searched terminals 602 and 603 are unknown. A collection terminal 601 moves along a straight-line track L. In a moving process, the collection terminal 601 receives wireless signals sent by the searched terminal 602 and the searched terminal 603, detects the received wireless signals sent by the searched terminal 602 and the searched terminal 603, forms a signal sequence 612 according to a detection result using multiple detected wireless signals sent by the searched terminal 602, and forms a signal sequence 613 according to the detection result using multiple detected wireless signals sent by the searched terminal 603. Strength of a wireless signal sent by the searched terminal 602 and detected by the collection terminal 601 at a location point A on the straight-line track L is the greatest. It can be learned from the figure that, the searched terminal 602 is on a straight line that passes through the location point A and is perpendicular to the straight-line track L. A distance between the collection terminal 601 and the searched terminal 602 is the shortest at the location point A, and the location point A may be used to represent the searched terminal 602. Likewise, a location point B may be used to represent the searched terminal 603. A location relationship between the location point A and the location point B represents a location relationship between the searched terminal 602 and the searched terminal 603. The location relationship between the location point A and the location point B is determined using a distance and an angle of orientation that are measured using an inertial navigation sensor group of the collection terminal 601.

Figure 16:
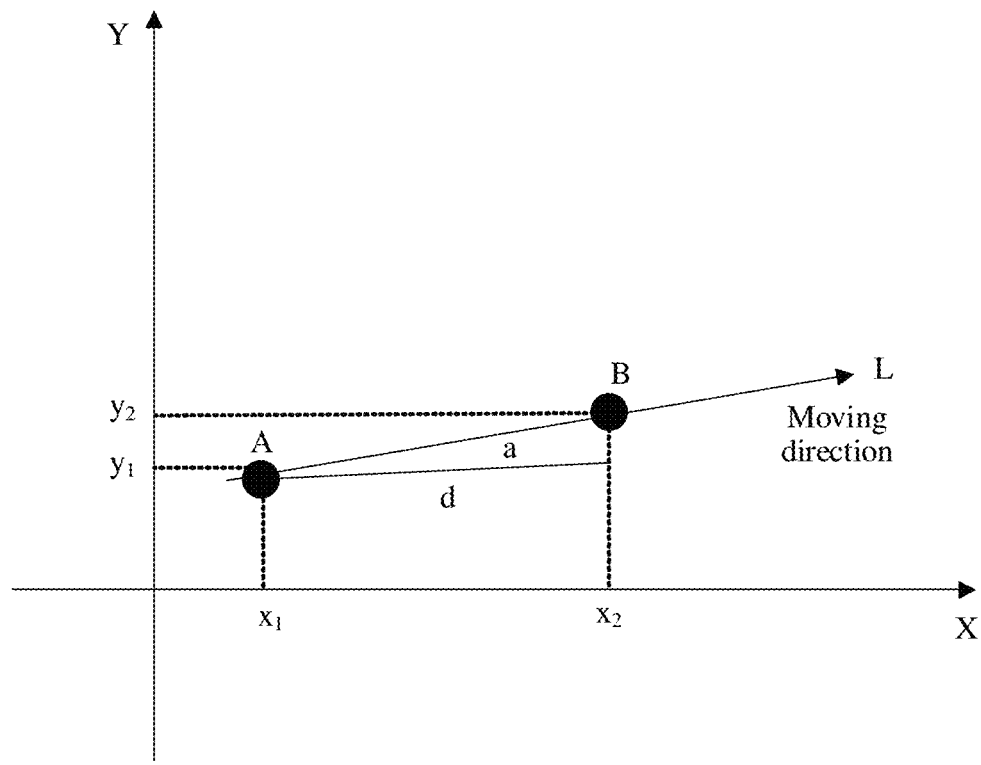
FIG. 16 is a schematic diagram of a method for representation with coordinate conversion according to an embodiment of the present disclosure.

Further, the location relationship between the location point A and the location point B is converted into coordinates for representation. As shown in FIG. 16, that the collection terminal moves along a straight-line track on a plane is used as an example, and the specific method is as follows.

An X-Y coordinate system is established with an X axis and a Y axis perpendicular to each other. A track from the location point A to the location point B is separately projected onto the X axis and the Y axis. The location point A and the location point B may be respectively represented using X and Y. Coordinates of the location point A are $(x_1, y_1)$, and coordinates of the location point B are $(x_2, y_2)$. Further, a direction change measured by the inertial navigation sensor group of the collection terminal moving from the location point A to the location point B is $\alpha$ in a unit of a degree. A distance measured by the inertial navigation sensor group of the collection terminal moving from the location point A to the location point B is d. Therefore, it may be obtained that $x_2-x_1=d\times\cos\alpha$, and $y_2-y_1=d\times\sin\alpha$. Optionally, assuming that the coordinates of the location point A are (0, 0), the coordinates of the location point B are ($d\times\cos\alpha$, $d\times\sin\alpha$). The method for determining a location relationship between location points according to displacement measured by the inertial navigation sensor group may be applied to a scenario of determining a location relationship between at least two location points according to displacement. The coordinates of the location point A and an identifier of the searched terminal 602 are used to form a location record 1=[sign A(0, 0)] of the searched terminal 602. Likewise, the coordinates of the location point B and an identifier of the searched terminal 603 are used to form a location record 2=[sign B($d\times\cos\alpha$, $d\times\sin\alpha$)] of the searched terminal 603. The location record 1 and the location record 2 form a location record sequence={[sign A(0, 0)], [sign B($d\times\cos\alpha$, $d\times\sin\alpha$)]} of the collection terminal 601 on the straight-line track L.

In this embodiment of the present disclosure, coordinates of a location point for obtaining a signal having greatest strength and an identifier of a corresponding searched terminal are used to form a location record such that a location relationship between multiple searched terminals whose locations are unknown can be determined, and a navigation path can be computed according to the location relationship between the searched terminals, thereby reducing costs of deploying and maintaining anchors whose locations are known.

Figure 17:
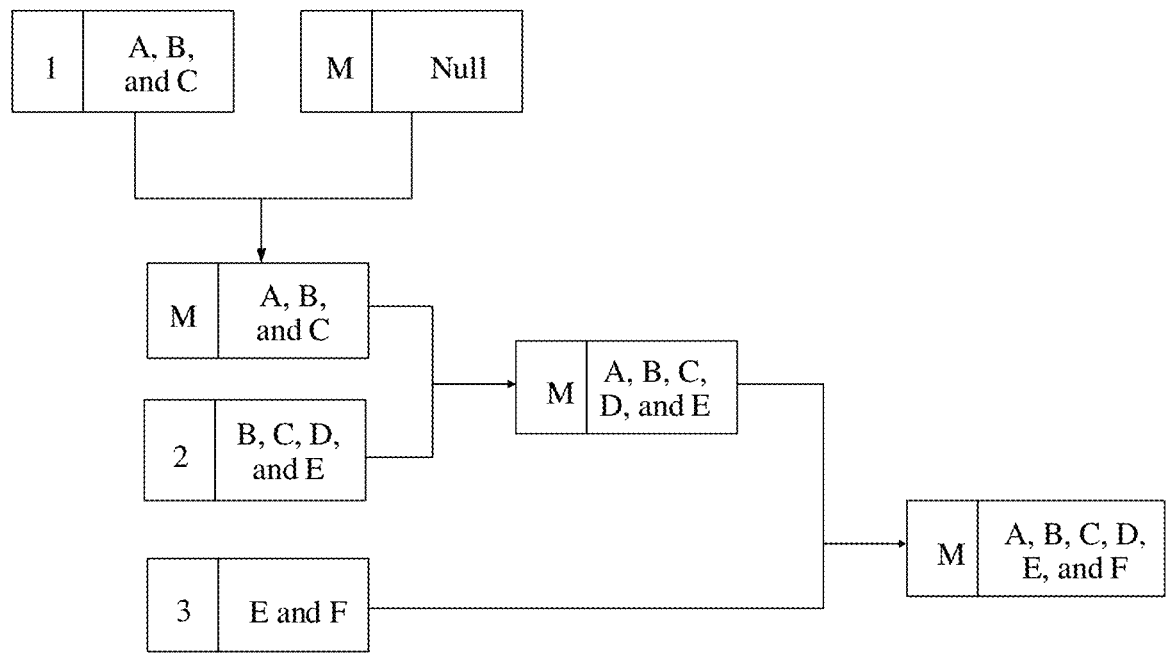
FIG. 17 is a flowchart of obtaining a location record set according to an embodiment of the present disclosure.

An embodiment of the present disclosure provides a method for obtaining a location record set. As shown in FIG. 17, a server receives three location record sequences. A location record sequence 1 includes location records of searched terminals A, B, and C. Assuming that coordinates of A are (0, 0), coordinates of B and coordinates of C are separately computed according to the coordinates of A and a location relationship between C and B, and are (xb, yb) and (xc, yc), and the location record sequence 1 is {[sign A(0, 0)], [sign B(xb, yb)], [sign C(xc, yc)]}. A location record sequence 2 includes location records of searched terminals B, C, D, and E. Assuming that coordinates of B are (0, 0), coordinates of C, coordinates of D, and coordinates of E are separately computed according to the coordinates of B and a location relationship between C, D, and E, and are (uc, yc), (ud, yd), and (ue, ye), and the location record sequence 2 is {[sign B(0, 0)], [sign C(uc, vc)], [sign D(ud, vd)], [sign E(ue, ve)]}. A location record sequence 3 includes location records of searched terminals E and F. Assuming that coordinates of E are (0, 0), coordinates of F are computed according to the coordinates of E and a location relationship between E and F, and are (uf, vf), and the location record sequence 3 is {[sign E(0, 0)], [sign F(uf, vf)]}.

The server configures a location record set M, and initializes M as an empty set, adds the first obtained location record sequence 1 to the location record set M, where M={A, B, C}, and checks the next location record sequence 2 {B, C, D, E}, where the location records of the searched terminals B and C that exist in the location record sequence 2 exist in the location record set M such that the location record sequence 2 is combined with the location record set, the location records of the searched terminals D and E are newly added to M, and M={A, B, C, D, E}. A specific algorithm is computing new coordinates (xb/2, yb/2) of B and new coordinates ((xc+uc)/2, (yc+vc)/2) of C according to $Xi=a \times xi+(1-a) \times ui$, $Yi=a \times yi+(1-a) \times vi$, and $Zi=a \times zi+(1-a) \times wi$, where $a=\frac{1}{2}$, separately computing new coordinates ((uc−xb−xc)/4, (vc−yb−yc)/4) of A, new coordinates ((uc−xb−xc)/4+ud, (vc−yb−yc)/4+vd) of D, and new coordinates ((uc−xb−xc)/4+ue, (vc−yb−yc)/4+ve) of E according to $$\left(\frac{\sum_{i=1}^{K}(X_i - x_i)}{K} + xx_p, \frac{\sum_{i=1}^{K}(Y_i - y_i)}{K} + yy_p, \frac{\sum_{i=1}^{K}(Z_i - z_i)}{K} + zz_p\right) \text{ and}$$

$$\left(\frac{\sum_{i=1}^{K}(X_i - u_i)}{K} + uu_q, \frac{\sum_{i=1}^{K}(Y_i - v_i)}{K} + vv_q, \frac{\sum_{i=1}^{K}(Z_i - w_i)}{K} + ww_q\right),$$

updating the computed new coordinates of A, B, C, D, and E to the new M, to obtain M={[sign A((uc−xb−xc)/4, (vc−yb−yc)/4)], [sign B (xb/2, yb/2)], [sign C((xc+uc)/2, (yc+vc)/2)], [sign D((uc−xb−xc)/4+ud, (vc−yb−yc)/4+vd)], [sign E((uc−xb−xc)/4+ue, (vc−yb−yc)/4+ve)]}.

The next location record sequence 3={E, F} is checked, and the location record of the searched terminal E that exists in the location record sequence 3 exists in the location record set M. Then, the location record sequence 3 and the location record set M are combined, the location record of the searched terminal F is newly added to M, and M={A, B, C, D, E, F}. A specific algorithm is computing new coordinates ((uc−xb−xc)/6+2×ue/3, (vc−yb−yc)/6+2×ve/3) of E according to $Xi=a \times xi+(1-a) \times ui$, $Yi=a \times yi+(1-a) \times vi$, and $Zi=a \times zi+(1-a) \times wi$, where $a=\frac{2}{3}$, separately computing new coordinates ((uc−xb−xc)/6−ue/3, (vc−yb−yc)/6−ve/3) of A, new coordinates ((7×xb+xc−uc)/12−ue/3, (7×yb+yc−vc)/12−ve/3) of B, new coordinates ((xb+7×xc+5×uc)/12−ue/3, (yb+7×yc+5×vc)/12−ve/3) of C, new coordinates ((uc−xb−xc)/6−ue/3+ud, (vc−yb−yc)/6−ve/3+vd) of D, and new coordinates ((xb+xc−uc)/12−ue/3+uf, (yb+yc−vc)/12−ve/3+vf) of F according to and $$\left(\frac{\sum_{i=1}^{K}(X_i - x_i)}{K} + xx_p, \frac{\sum_{i=1}^{K}(Y_i - y_i)}{K} + yy_p, \frac{\sum_{i=1}^{K}(Z_i - z_i)}{K} + zz_p\right)$$

$$\left(\frac{\sum_{i=1}^{K}(X_i - u_i)}{K} + uu_q, \frac{\sum_{i=1}^{K}(Y_i - v_i)}{K} + vv_q, \frac{\sum_{i=1}^{K}(Z_i - w_i)}{K} + ww_q\right),$$

updating the computed new coordinates of A, B, C, D, E, and F to the new M, to obtain M={[sign A((uc−xb−xc)/6−ue/3, (vc−yb−yc)/6−ve/3)], [sign B((7×xb+xc−uc)/12−ue/3, (7×yb+yc−vc)/12−ve/3)], [sign C((xb+7×xc+5×uc)/12−ue/3, (yb+7×yc+5×vc)/12−ve/3)], [sign D((uc−xb−xc)/6−ue/3+ud, (vc−yb−yc)/6−ve/3+vd)], [sign E((uc−xb−xc)/6+2×ue/3, (vc−yb−yc)/6+2×ve/3)], [sign F((xb+xc−uc)/12−ue/3+uf, (yb+yc−vc)/12−ve/3+vf)]}.

In this embodiment of the present disclosure, using coordinates of a searched terminal whose location record exists both in two location record sequences, coordinates of other searched terminals in a combined location record set are computed, and in this way, a location record set including location records of more searched terminals can be obtained.

Figure 18:
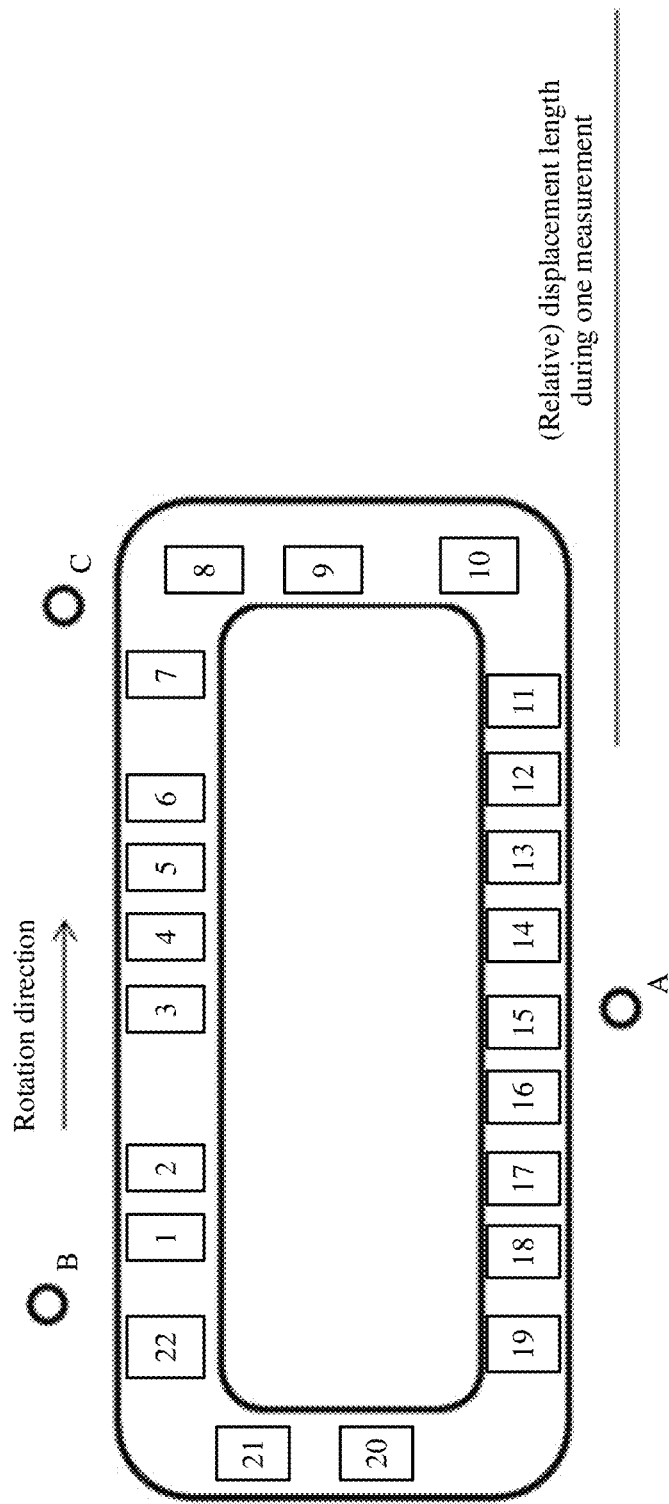
FIG. 18 is a schematic diagram of picking up luggage according to an embodiment of the present disclosure.

In the foregoing embodiments of the present disclosure, a searched object does not move within a time period, and a searcher searches for the target searched object using a navigation path. However, there may be a scenario in which a searcher moves less or even does not move, but a searched object continuously moves. In this scenario, a location relationship between searched objects is still relatively stable, and the object searching method in the present disclosure is also applicable to the scenario. A difference lies in that a relative measurement module measures displacement data between the searcher and the searched object. A typical application scenario example is picking up luggage. As shown in FIG. 18, a specific method is as follows.

A speed measurement sensor is arranged on a conveyor belt, and the speed measurement sensor sends detected information indicating that a speed of the conveyor belt is 0.8 meter/second to ambient searching terminals A, B, and C.

Optionally, the searching terminals A, B, and C measure, using inertial navigation sensor groups, that moving speeds of the searching terminals are less than or equal to an initial speed of the conveyor belt, and determine that data generated by a wireless signal sent by a measured searched terminal is valid.

The searching terminals separately detect wireless signals sent by ambient searched terminals, form a signal sequence using detected wireless signals sent by a same searched terminal, and mark a location of a searching terminal for receiving a wireless signal having greatest strength in the signal sequence as a location point. A searched terminal corresponding to the location point is closest to the searching terminal at the location point, and the location point is used to represent a location of the corresponding searched terminal. A time of moving from one location point to another location point may be multiplied by the initial speed of the conveyor belt to obtain a distance between the location points. Assuming that coordinates of one location point are 0, coordinates of the searched terminals detected by the other searching terminals may be computed according to the relative distance. An identifier of a searched terminal and coordinates of a corresponding location point form a location record of the searched terminal. Optionally, the searching terminal may send strength of the wireless signal sent by the detected searched terminal and displacement data of the searching terminal to the server. The server computes a location record of the searched terminal, and forms a location record set.

It is assumed that after computation, a location record sequence of searched terminals detected by a searching terminal A is {22(0), 21(2.8), 20(4.3), 19(7.5), 18(11), 17(11.9), 14(13), 15(14.2), 12(14.5), 13(14.9)}, where it is noted that numbers in the brackets represent coordinates in a unit of a meter, and numbers outside the brackets represent identifiers of the searched terminals, a location record sequence of searched terminals detected by a searching terminal B is {9(0), 7(3.2), 8(3.3), 5(7.2), 6(7.3), 4(8.1), 3(9.7), 1(13.6), 2(13.8), 22(16.7)}, and a location record sequence of searched terminals detected by a searching terminal C is {13(0), 12(0.5), 11(0.7), 10(5.8), 9(8.1), 8(9.9), 7(12.4)}.

It is assumed that a target searched object for which the searching terminal A needs to search is a searched terminal 1. The searching terminals A, B, and C send the location record sequences of detected searched terminals to the server, to form a location record set M including location records of more searched terminals. According to the method in this embodiment of the present disclosure, first, the location record sequence of the searched terminals detected by the searching terminal A is added to the location record set M. That is, the location record set M={22(0), 21(2.8), 20(4.3), 19(7.5), 18(11), 17(11.9), 14(13), 15(14.2), 12(14.5), 13(14.9)}. The location record sequence of the searched terminals detected by the searching terminal B is checked to find that a searched terminal 22 exists in the location record set M, and location records of the searched terminals detected by the searching terminal B are added to M. According to the algorithm $Xi=a \times xi+(1-a) \times ui$ in this embodiment of the present disclosure, where $a=\frac{1}{2}$, new coordinates $(16.7+0)/2=8.4$ of the searched terminal 22 may be computed. Coordinates of the other searched objects may be obtained based on the new coordinates of the searched terminal 22 using the algorithms $$\left( \frac{\sum_{i=1}^{K}(X_i - x_i)}{K} + xx_p, \frac{\sum_{i=1}^{K}(Y_i - y_i)}{K} + yy_p, \frac{\sum_{i=1}^{K}(Z_i - z_i)}{K} + zz_p \right) \text{ and}$$

$$\left( \frac{\sum_{i=1}^{K}(X_i - u_i)}{K} + uu_q, \frac{\sum_{i=1}^{K}(Y_i - v_i)}{K} + vv_q, \frac{\sum_{i=1}^{K}(Z_i - w_i)}{K} + ww_q \right)$$

in this embodiment of the present disclosure. The computed new coordinates of the searched terminals in M are updated to the location record set M. That is, M={9(−8.3), 7(−5.1), 8(−5), 5(−1.1), 6(−1), 4(−0.2), 3(1.4), 1(5.3), 2(5.5), 22(8.4), 21(11.2), 20(12.7), 19(15.9), 18(19.4), 17(20.3), 14(21.4), 15(22.6), 12(22.9), 13(23.3)}. Further, conversion into coordinate values is performed. Assuming that maximum values of coordinates are 40, the coordinates need to be converted into values within a range [0, 40), and the set M={9(31.7), 7(34.9), 8(35), 5(38.9), 6(39), 4(39.8), 3(1.4), 1(5.3), 2(5.5), 22(8.4), 21(11.2), 20(12.7), 19(15.9), 18(19.4), 17(20.3), 14(21.4), 15(22.6), 12(22.9), 13(23.3)} may be obtained according to a conversion formula. The location record sequence of the searched terminals detected by the searching terminal C is further checked to find that location records of searched terminals 7, 8, 9, 12, and 13 exist in the set M, and the location records of the searched terminals detected by the searching terminal are added to the location record set M. The same as the foregoing algorithm, where $a=\frac{2}{3}$, coordinates of the searched terminals 7, 8, 9, 12, and 13 may be separately computed and are 27.4, 26.6, 23.8, 15.4, and 15.5. New coordinates of the other searched terminals in the location record set M may be computed based on the new coordinates of the searched terminals 7, 8, 9, 12, and 13 using the same algorithm, and are updated to the location record set M. That is, M={5(31.3), 6(31.4), 4(32.2), 3(33.8), 1(37.7), 2(37.9), 22(0.8), 21(3.6), 20(5.1), 19(8.3), 18(11.8), 17(12.7), 14(13.8), 15(15), 12(15.4), 13(15.5), 11(16.3), 10(21.4), 9(23.8), 8(26.6), 7(27.4)}.

Further, the searching terminals detect wireless signals sent by ambient searched terminals, and send the wireless signals of the detected searched terminals 16, 15, 14, and 13 to the server. The server does not have a location record of the searched terminal 16. Therefore, coordinates (14.8) of the searching terminal A and coordinates (37.7) of a target searched terminal 1 are obtained according to coordinates of the searched terminals 15, 14, and 13 by means of a centroid method. Therefore, a distance of 22.9 meters between the searching terminal A and the searched terminal 1 is computed. The searching terminal notifies the result to the searcher. Optionally, a time of arrival may be computed based on a relative speed (the initial speed of the conveyor belt), and the time is notified to the searcher. Optionally, it indicates that the searched terminal is at a location 17.1 meters from the searcher in a direction departing from the searcher.

It should be noted that the searching terminal in this embodiment has functions of a collection terminal and a searching terminal. When obtaining a location relationship, the searching terminal is the collection terminal described in the foregoing embodiment. When searching for an object, the searching terminal is the searching terminal described above.

In this embodiment of the present disclosure, coordinates of a location point are obtained based on a measurement result of a relative measurement instrument, and the coordinates of the location point and an identifier of a corresponding searched terminal form a location record such that a location relationship between multiple searched terminals whose locations are unknown can be determined, and a navigation result can be computed according to the location relationship, thereby reducing costs of deploying and maintaining anchors whose locations are known.

Figure 19:
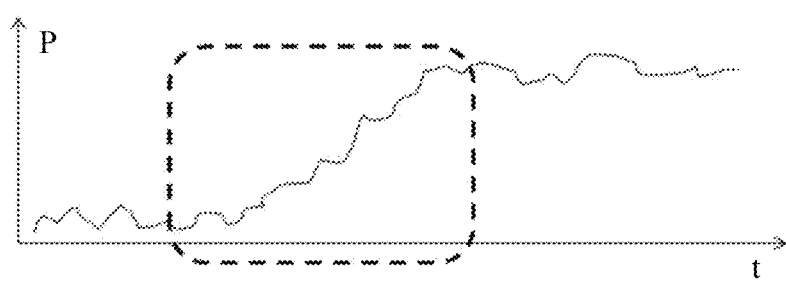
FIG. 19 is a schematic diagram of a change of a barometric pressure measurement value occurring when a terminal is moved downstairs according to an embodiment of the present disclosure.

In the foregoing several embodiments, only a two-dimensional plane is considered in most cases. However, in actual application, multiple floors may be involved, to form three-dimensional object searching space. In this case, only a parameter representing a height needs to be added to a coordinate parameter in a location record. Based on the foregoing embodiment of the two-dimensional plane, an embodiment provides a method for measuring displacement in a height direction. Optionally, displacement of a collection terminal in a height direction is measured using a barometric pressure sensor or an accelerator, and the sensors configured to measure a height may be collectively referred to as a height measurement module. FIG. 19 shows a barometric pressure change measured when the terminal moves downstairs. Displacement, of the terminal in a height direction, relative to a location point that the terminal previously passes through may be computed based on the barometric pressure change. A concept of the location point is the same as the definition in the foregoing embodiments.

In the method for measuring displacement in a height direction provided in this embodiment, the height measurement module measures the displacement of the terminal in the height direction, to compute a location relationship between terminals in the height direction. With reference to the methods and algorithms in the foregoing embodiments, a location record set representing a location relationship between searched terminals whose locations are unknown in the three-dimensional object searching space can be obtained, to search for an object in the three-dimensional object searching space, thereby reducing costs of deploying and maintaining anchors whose locations are known.

Figure 20:
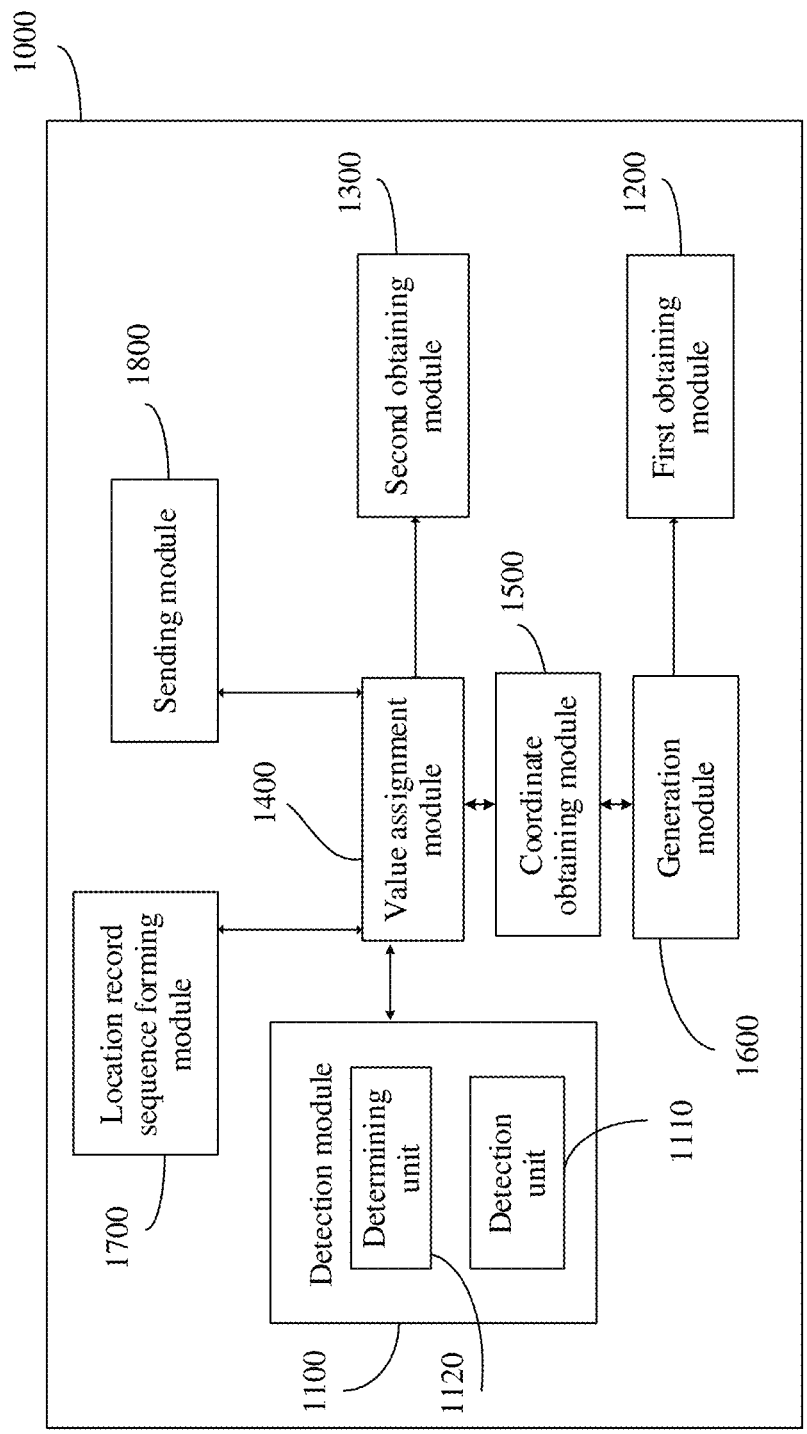
FIG. 20 is a schematic diagram of a terminal according to an embodiment of the present disclosure.

The present disclosure provides a collection terminal. As shown in FIG. 20, the collection terminal 1000 includes a detection module 1100, a first obtaining module 1200, a second obtaining module 1300, a value assignment module 1400, a coordinate obtaining module 1500, a generation module 1600, a location record sequence forming module 1700, and a sending module 1800.

The detection module 1100 is configured to detect wireless signals sent by ambient searched terminals when the collection terminal 1000 moves.

The first obtaining module 1200 is configured to obtain at least two reference location points according to the wireless signals sent by the ambient searched terminals and detected by the detection module 1100. Each reference location point is a location point for obtaining, by the collection terminal, a wireless signal that has greatest strength in multiple wireless signals sent by a corresponding searched terminal.

The second obtaining module 1300 is configured to use, as a benchmark location point, either of the at least two reference location points obtained by the first obtaining module 1200, and obtain a reference location relationship between the other reference location points and the benchmark location point. The reference location relationship includes a distance between the other reference location points and the benchmark location point and an angle of orientation of the other reference location points relative to the benchmark location point, and the reference location relationship is used to indicate a location relationship between a searched terminal corresponding to the other reference location points and a searched terminal corresponding to the benchmark location point.

The value assignment module 1400 is configured to set, as initial coordinates, coordinates of the benchmark location point specified by the second obtaining module 1300, and assign values to the initial coordinates.

The coordinate obtaining module 1500 is configured to compute coordinates of the other reference location points according to the reference location relationship obtained by the second obtaining module 1300 and the initial coordinates specified by the value assignment unit 1400.

The generation module 1600 is configured to generate one location record for one of the reference location points obtained by the first obtaining module 1200. The location record includes coordinates of the reference location point and an identifier of a searched terminal corresponding to the reference location point.

The location record sequence forming module 1700 is configured to form a location record sequence using all location records generated by the generation module 1600.

The sending module 1800 is configured to send the location record sequence formed by the location record sequence forming module 1700 to a third party device. Optionally, the third party device may be a server.

Further, the detection module 1100 includes a detection unit 1110 and a determining unit 1120. The detection unit 1110 is configured to detect the wireless signals sent by the ambient searched terminals, and obtain identifiers of the detected searched terminals and strength of the wireless signals.

The determining unit 1120 is configured to determine, based on a signal ratio, whether a wireless signal detected by the detection unit 1110 is a wireless signal sent by the searched terminal.

The determining unit 1120 is further configured to determine whether a signal ratio of the wireless signal detected by the detection unit 1110 is greater than or equal to a preset signal ratio threshold, and if the signal ratio of the wireless signal detected by the detection unit 1110 is greater than or equal to the signal ratio threshold, determine that the wireless signal detected by the detection unit 1110 is the wireless signal sent by the searched terminal, or if the signal ratio is less than the signal ratio threshold, determine that the wireless signal detected by the detection unit 1110 is not the wireless signal sent by the searched terminal.

The terminal provided in the present disclosure records, as the reference location point corresponding to the searched terminal, the location point for obtaining, by the terminal, the wireless signal that has the greatest strength in the wireless signals sent by the searched terminal, the location relationship between the reference location points indicates the location relationship between the corresponding searched terminals, and the location record sequence representing the location relationship between the searched terminals can be obtained based on the location relationship. Therefore, a location relationship between searched terminals whose locations are unknown can be determined, and the location relationship between the searched terminals whose locations are unknown can be determined without deploying anchors whose locations are known, thereby reducing costs of deploying and maintaining anchors.

Figure 21A:
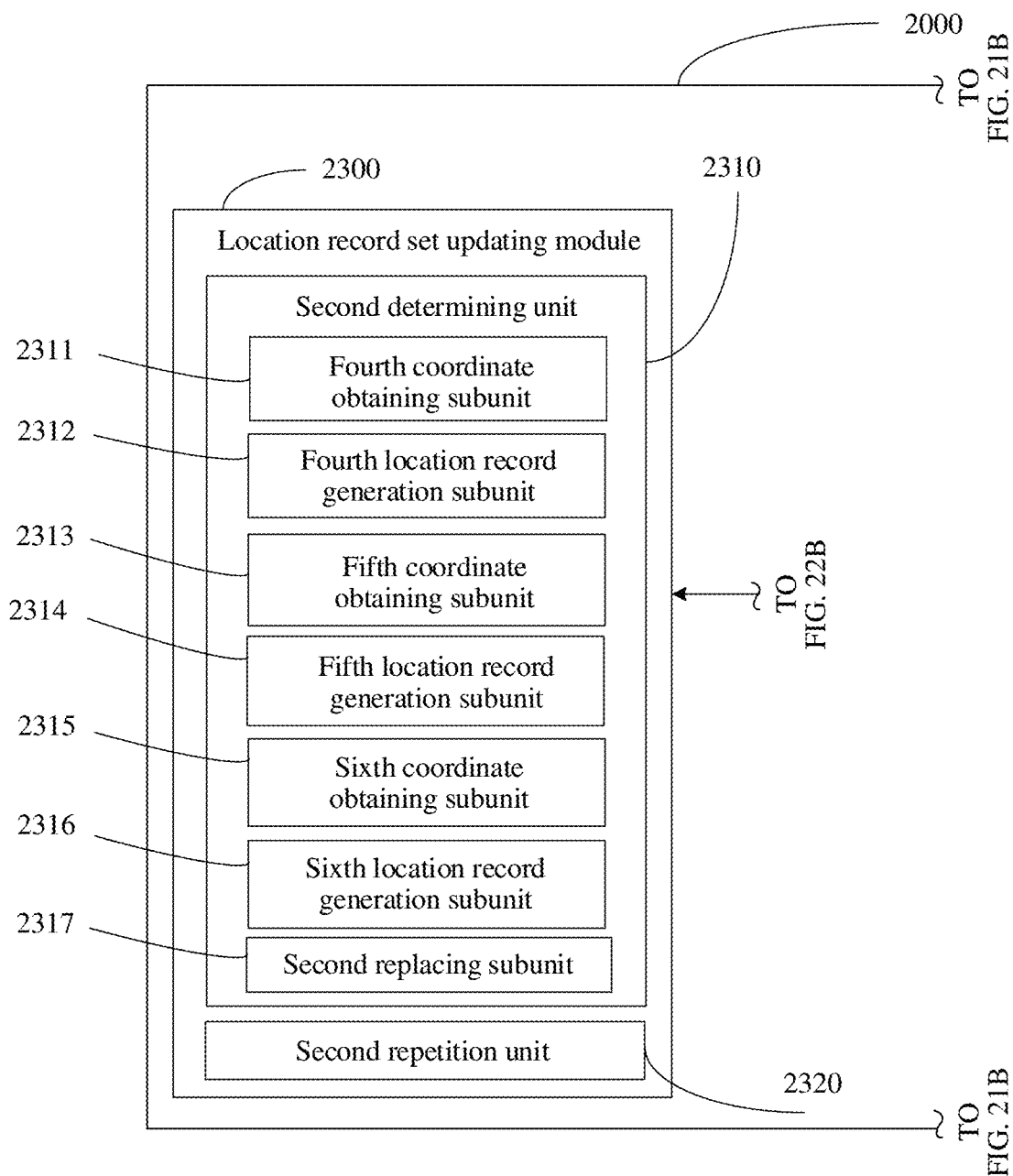
FIG. 21A and FIG. 21B are a schematic diagram of a device according to an embodiment of the present disclosure.
Figure 21B:
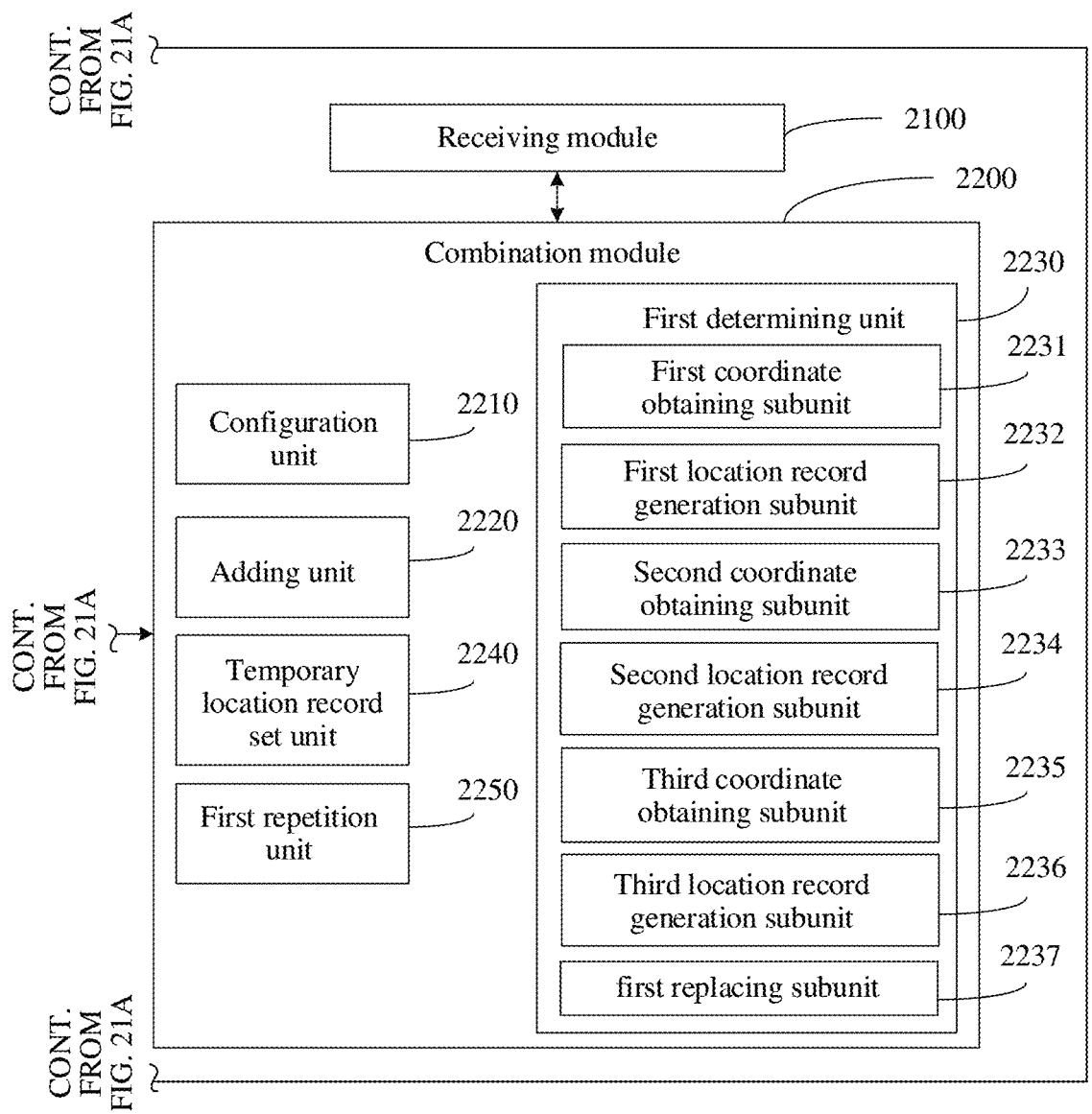

The present disclosure provides a device 2000 configured to combine location relationships. As shown in FIG. 21B, the device 2000 includes a receiving module 2100 and a combination module 2200.

The receiving module 2100 is configured to receive at least two location record sequences from a collection terminal. Each location record sequence includes at least two location records, a location record includes coordinates of a reference location point and an identifier of a searched terminal corresponding to the reference location point, and the reference location point is a location point for obtaining a wireless signal that has greatest strength from the searched terminal when the collection terminal moves.

The combination module 2200 is configured to combine the at least two location record sequences received by the receiving module 2100 into a location record set in a coordinate system. The location record set includes coordinates of reference location points corresponding to the at least two location records in the coordinate system and identifiers of searched terminals corresponding to the reference location points.

Further, the combination module 2200 includes a configuration unit 2210, an adding unit 2220, a first determining unit 2230, a temporary location record set unit 2240, and a first repetition unit 2250.

The configuration unit 2210 is configured to configure a location record set, and initialize the location record set as an empty set.

The adding unit 2220 is configured to add location records in a first location record sequence to the location record set initialized by the configuration unit 2210. The first location record sequence is any location record sequence received by the receiving module 2100.

The first determining unit 2230 is configured to determine whether a location record of at least one searched terminal exists in both a next location record sequence received by the receiving module 2100 and the location record set, and if the location record of the at least one searched terminal exists in both the next location record sequence and the location record set, combine the next location record sequence with the location record set, or if the location record of the at least one searched terminal does not exist in both the next location record sequence and the location record set, save the next location record sequence into the temporary location record set unit 2240.

The first repetition unit 2250 is configured to trigger the first determining unit 2230 to repeat the determining process until the determining process is performed for all location record sequences received by the receiving module 2100, and obtain the location record set.

Further, the first determining unit 2230 includes a first coordinate obtaining subunit 2231, a first location record generation subunit 2232, a second coordinate obtaining subunit 2233, a second location record generation subunit 2234, a third coordinate obtaining subunit 2235, a third location record generation subunit 2236, and a first replacing subunit 2237.

The first coordinate obtaining subunit 2231 is configured to obtain first coordinates according to coordinates corresponding to a first searched terminal in the next location record sequence received by the receiving module 2100 and coordinates in the location record set. The first searched terminal is a searched terminal whose location record exists in both the next location record sequence received by the receiving module 2100 and the location record set.

The first location record generation subunit 2232 is configured to generate a first location record for the first searched terminal. The first location record includes the first coordinates obtained by the first coordinate obtaining subunit 2231 and an identifier of the searched terminal.

The second coordinate obtaining subunit 2233 is configured to obtain second coordinates according to the first coordinates obtained by the first coordinate obtaining subunit 2231 and coordinates corresponding to a first remaining searched terminal in the next location record sequence received by the receiving module 2100. The first remaining searched terminal is a searched terminal other than the searched terminal in searched terminals corresponding to the next location record sequence received by the receiving module 2100.

The second location record generation subunit 2234 is configured to generate a second location record for the first remaining searched terminal. The second location record includes the second coordinates obtained by the second coordinate obtaining subunit 2233 and an identifier of the first remaining searched terminal.

The third coordinate obtaining subunit 2235 is configured to obtain third coordinates according to the first coordinates obtained by the first coordinate obtaining subunit 2231 and coordinates corresponding to a second remaining searched terminal in the location record set. The second remaining searched terminal is a searched terminal other than the searched terminal in the location record set.

The third location record generation subunit 2236 is configured to generate a third location record for the second remaining searched terminal. The third location record includes the third coordinates obtained by the third coordinate obtaining subunit 2235 and an identifier of the second remaining searched terminal.

The first replacing subunit 2237 is configured to replace location records in the location record set with all the first location record generated by the first location record generation subunit 2232, the second location record generated by the second location record generation subunit 2234, and the third location record generated by the third location record generation subunit 2236.

The device 2000 further includes a location record set updating module 2300 configured to update the location record set.

The location record set updating module 2300 includes a second determining unit 2310 and a second repetition unit 2320.

The second determining unit 2310 is configured to determine whether a location record of at least one searched terminal exists in both a location record sequence stored in the temporary location record set unit 2240 and the location record set, and if the location record of the at least one searched terminal exists in both the location record sequence stored in the temporary location record set unit 2240 and the location record set, combine the location record sequence with the location record set, or if the location record of the at least one searched terminal does not exist in both the location record sequence stored in the temporary location record set unit 2240 and the location record set, re-save the location record sequence into the temporary location record set unit 2240.

The second repetition unit 2320 is configured to trigger the second determining unit 2310 to repeat the determining process until the determining process is performed for all location record sequences stored in the temporary location record set unit, and obtain an updated location record set.

Further, the second determining unit 2310 includes a fourth coordinate obtaining subunit 2311, a fourth location record generation subunit 2312, a fifth coordinate obtaining subunit 2313, a fifth location record generation subunit 2314, a sixth coordinate obtaining subunit 2315, a sixth location record generation subunit 2316, and a second replacing subunit 2317.

The fourth coordinate obtaining subunit 2311 is configured to obtain fourth coordinates according to coordinates corresponding to a second searched terminal in the location record sequence stored in the temporary location record set unit 2240 and coordinates in the location record set. The second searched terminal is a searched terminal whose location record exists in both the location record sequence stored in the temporary location record set unit 2240 and the location record set.

The fourth location record generation subunit 2312 is configured to generate a fourth location record for the second searched terminal. The fourth location record includes the fourth coordinates obtained by the fourth coordinate obtaining subunit 2311 and an identifier of the searched terminal.

The fifth coordinate obtaining subunit 2313 is configured to obtain fifth coordinates according to the fourth coordinates obtained by the fourth coordinate obtaining subunit 2311 and coordinates corresponding to a third remaining searched terminal in the location record sequence stored in the temporary location record set unit 2240. The third remaining searched terminal is a searched terminal other than the searched terminal in searched terminals corresponding to the next location record sequence stored in the temporary location record set unit 2240.

The fifth location record generation subunit 2314 is configured to generate a fifth location record for the third remaining searched terminal. The fifth location record includes the fifth coordinates obtained by the fifth coordinate obtaining subunit 2313 and an identifier of the third remaining searched terminal.

The sixth coordinate obtaining subunit 2315 is configured to obtain sixth coordinates according to the fourth coordinates obtained by the fourth coordinate obtaining subunit 2311 and coordinates corresponding to a fourth remaining searched terminal in the location record set. The fourth remaining searched terminal is a searched terminal other than the searched terminal in the location record set.

The sixth location record generation subunit 2316 is configured to generate a sixth location record for the fourth remaining searched terminal. The sixth location record includes the sixth coordinates obtained by the sixth coordinate obtaining subunit 2315 and an identifier of the fourth remaining searched terminal.

The second replacing subunit 2317 is configured to replace location records in the location record set with all the fourth location record generated by the fourth location record generation subunit 2312, the fifth location record generated by the fifth location record generation subunit 2314, and the sixth location record generated by the sixth location record generation subunit 2316.

The device provided in this embodiment of the present disclosure combines the received location record sequence according to a standard that the location record including the identifier of the searched terminal exists in both the received location record sequence and the location record set to obtain the location record set such that multiple location record sequences are combined into one location record set.

Figure 22:
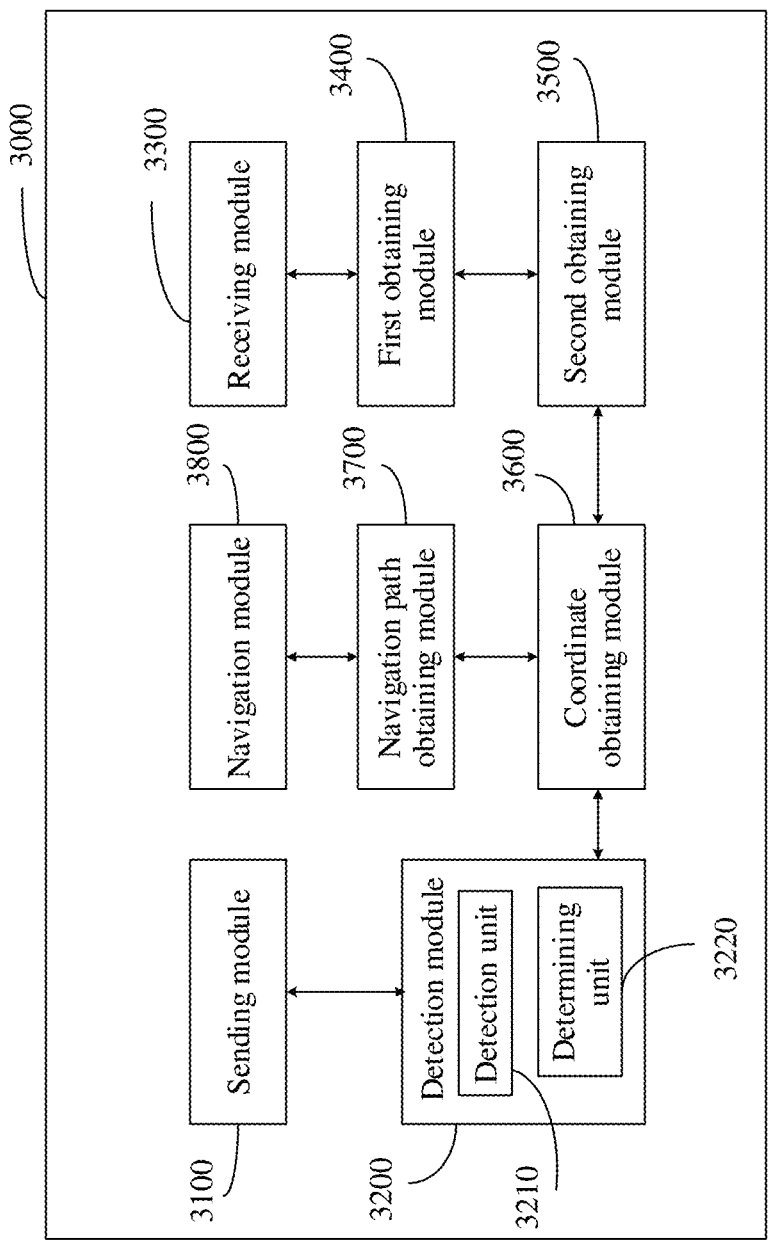
FIG. 22 is a schematic diagram of a searching terminal according to an embodiment of the present disclosure.

An embodiment of the present disclosure provides a searching terminal 3000. As shown in FIG. 22, the searching terminal 3000 includes a sending module 3100, a detection module 3200, a receiving module 3300, a first obtaining module 3400, a second obtaining module 3500, a coordinate obtaining module 3600, a navigation path obtaining module 3700, and a navigation module 3800.

The sending module 3100 is configured to send a request for searching for a target searched terminal to a server (or a third party device). The request is used to trigger the server to send a location record set, the location record set includes at least two location records, a location record includes coordinates of a reference location point and an identifier of a searched terminal corresponding to the reference location point, and the reference location point is a location point for obtaining a wireless signal that has greatest strength from the searched terminal when a collection terminal moves.

The detection module 3200 is configured to detect a wireless signal sent by an ambient searched terminal, and obtain an identifier of the detected searched terminal and strength of the wireless signal. The target searched terminal is one of the searched terminal.

The receiving module 3300 is configured to receive the location record set sent by the server.

The first obtaining module 3400 is configured to search the location record set received by the receiving module 3300 for a target location record, and obtain coordinates in the target location record. The target location record is a location record including an identifier of the target searched terminal.

The second obtaining module 3500 is configured to search the location record set received by the receiving module 3300 for a reference location record, and obtain coordinates in the reference location record. The reference location record is a location record including the identifier of the searched terminal detected by the searching terminal.

The coordinate obtaining module 3600 is configured to compute coordinates of the searching terminal according to the coordinates obtained by the second obtaining module 3500, or compute coordinates of the searching terminal according to the coordinates obtained by the second obtaining module 3500 and the strength of the wireless signal detected by the detection module 3200.

The navigation path obtaining module 3700 is configured to compute a navigation path according to the coordinates of the searching terminal obtained by the coordinate obtaining module 3600 and the coordinates obtained by the first obtaining module 3400.

The navigation module 3800 is configured to search for the target searched terminal according to the navigation path obtained by the navigation path obtaining module 3700.

Further, the detection module 3200 includes a detection unit 3210 and a determining unit 3220.

The detection unit 3210 is configured to detect the wireless signal sent by the ambient searched terminal, and obtain the identifier of the detected searched terminal and the strength of the wireless signal.

The determining unit 3220 is configured to determine, based on a signal ratio, whether a wireless signal detected by the detection unit 3210 is a wireless signal sent by the searched terminal.

The determining unit 3220 is further configured to determine whether a signal ratio of the wireless signal detected by the detection unit 3210 is greater than or equal to a preset signal ratio threshold, and if the signal ratio of the wireless signal detected by the detection unit 3210 is greater than or equal to the signal ratio threshold, determine that the wireless signal detected by the detection unit 3210 is the wireless signal sent by the searched terminal, or if the signal ratio is less than the signal ratio threshold, determine that the wireless signal detected by the detection unit 3210 is not the wireless signal sent by the searched terminal.

Optionally, the coordinate obtaining module 3600 is further configured to compute the coordinates $(X_i, Y_i)$ of the searching terminal according to $$X_i = \frac{\sum_{i=1}^{n} x_i}{n} \text{ and } Y_i = \frac{\sum_{i=1}^{n} y_i}{n}.$$

The coordinates obtained by the second obtaining module 3500 are $(x_i, y_i)$, and n is a quantity of coordinates obtained by the second obtaining module 3500.

Optionally, the coordinate obtaining module 3600 is further configured to compute the coordinates $(X_i, Y_1)$ of the searching terminal according to $$X_i = \frac{\sum_{i=1}^{n} \frac{x_i}{P_i}}{\sum_{i=1}^{n} P_i} \text{ and } Y_i = \frac{\sum_{i=1}^{n} \frac{y_i}{P_i}}{\sum_{i=1}^{n} P_i}.$$

The coordinates obtained by the second obtaining module 3500 are $(x_i, y_i)$, $P_i$ (dBm) is the strength of the wireless signal detected by the detection module 3200, and n is a quantity of coordinates obtained by the second obtaining module 3500.

In this embodiment of the present disclosure, based on a feature that a location relationship between searched objects is stable, a stable location relationship is converted into a location relationship set including coordinates and identifiers, coordinates of a target searched object and coordinates of a searcher may be obtained according to the location relationship set, and a navigation path is then computed according to the coordinates of the target searched object and the coordinates of the searcher such that the target object can be found quickly and simply when location information of the searched object and location information of the searcher cannot be determined. In the object searching method provided in this embodiment of the present disclosure, no anchor whose location is known needs to be deployed, thereby reducing costs of deploying and maintaining anchors.

Figure 23:
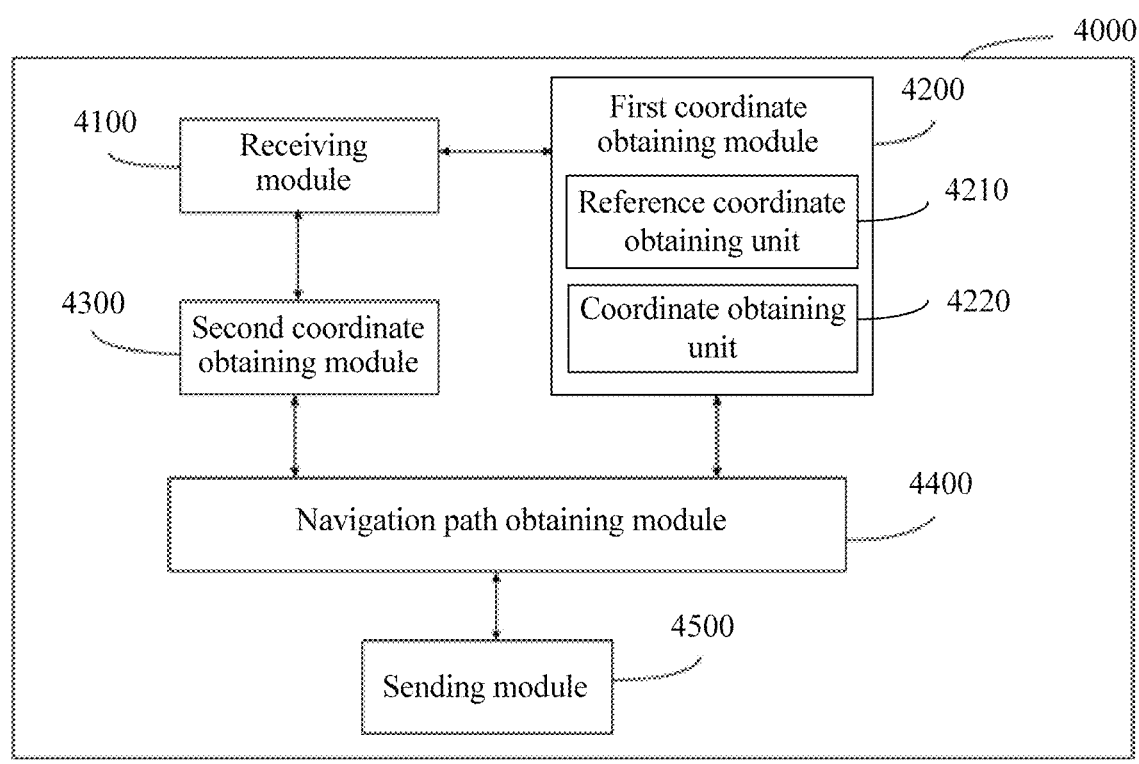
FIG. 23 is a schematic diagram of a server according to an embodiment of the present disclosure.

An embodiment of the present disclosure provides a server 4000. As shown in FIG. 23, the server 4000 includes a receiving module 4100, a first coordinate obtaining module 4200, a second coordinate obtaining module 4300, a navigation path obtaining module 4400, and a sending module 4500.

The receiving module 4100 is configured to receive an object searching request sent by a searching terminal for searching for a target searched terminal. The object searching request carries an identifier of the target searched terminal.

The first coordinate obtaining module 4200 is configured to obtain coordinates of the searching terminal.

The second coordinate obtaining module 4300 is configured to search a location record set for a target location record according to the identifier of the target searched terminal received by the receiving module 4100, and obtain coordinates in the target location record. The location record set includes at least two location records, a location record includes coordinates of a reference location point and an identifier of a searched terminal corresponding to the reference location point, the reference location point is a location point for obtaining a wireless signal that has greatest strength from the searched terminal when a collection terminal moves, and the target location record is a location record including the identifier of the target searched terminal.

The navigation path obtaining module 4400 is configured to compute a navigation path according to the coordinates obtained by the first coordinate obtaining module 4200 and the coordinates obtained by the second coordinate obtaining module 4300.

The sending module 4500 is configured to send the navigation path obtained by the navigation path obtaining module 4400 to the searching terminal.

Optionally, the first coordinate obtaining module 4200 is further configured to obtain the coordinates of the searching terminal from the searching terminal.

Optionally, the first coordinate obtaining module 4200 includes a reference coordinate obtaining unit 4210 and a coordinate obtaining unit 4220.

The reference coordinate obtaining unit 4210 is configured to search the location record set for a reference location record, and obtain coordinates in the reference location record. The reference location record is a location record that is received by the receiving module 4100 and that includes an identifier of the searched terminal that is detected when the searching terminal sends the object searching request.

The coordinate obtaining unit 4220 is configured to compute the coordinates of the searching terminal according to the coordinates obtained by the reference coordinate obtaining unit 4210, or compute the coordinates of the searching terminal according to the coordinates obtained by the reference coordinate obtaining unit 4210 and strength that is received by the receiving module 4100, that is of a wireless signal sent by the searched terminal, and that is detected when the searching terminal sends the object searching request.

Further, the coordinate obtaining unit 4220 is further configured to compute the coordinates $(X_i, Y_i)$ of the searching terminal according to $$X_i = \frac{\sum_{i=1}^{n} x_i}{n} \text{ and } Y_i = \frac{\sum_{i=1}^{n} y_i}{n},$$

where the coordinates obtained by the reference coordinate obtaining unit 4210 are $(x_i, y_i)$, and n is a quantity of coordinates obtained by the reference coordinate obtaining unit 4210, or compute the coordinates $(X_i, Y_i)$ of the searching terminal according to $$X_i = \frac{\sum_{i=1}^{n} \frac{x_i}{P_i}}{\sum_{i=1}^{n} P_i} \text{ and } Y_i = \frac{\sum_{i=1}^{n} \frac{y_i}{P_i}}{\sum_{i=1}^{n} P_i},$$

where the coordinates obtained by the reference coordinate obtaining unit 4210 are $(x_i, y_i)$, $P_i$ (dBm) is the strength of the wireless signal detected by the searching terminal and received by the receiving module 4100, and n is a quantity of coordinates obtained by the reference coordinate obtaining unit 4210.

In this embodiment of the present disclosure, based on a feature that a location relationship between searched objects is stable, a stable location relationship is converted into a location relationship set including coordinates and identifiers, coordinates of a target searched object and coordinates of a searcher may be obtained according to the location relationship set, and a navigation path is then computed according to the coordinates of the target searched object and the coordinates of the searcher such that the target object can be found quickly and simply when location information of the searched object and location information of the searcher cannot be determined. In the object searching method provided in this embodiment of the present disclosure, no anchor whose location is known needs to be deployed, thereby reducing costs of deploying and maintaining anchors.

An embodiment of the present disclosure provides an application scenario of searching for a car in a parking lot. An owner A drives a car B to enter a parking lot C, and parks the car B in the parking lot. The owner A leaves the parking lot for a time period and returns to the parking lot to search for the car B. In an actual scenario, especially in a strange parking lot, even if there are instruction icons and codes in the parking lot, it is not easy for the owner to quickly find the car. This embodiment of the present disclosure provides a method for searching for a car. Specific details are as follows.

After entering the parking lot, the owner A turns on the searching terminal to search for the object. During actual implementation, the object searching method may be further a car searching APP in a collection terminal. For example, a mobile phone onto which a car searching APP is installed is a searching terminal.

1. The searching terminal activated by the owner A scans a wireless signal sent by a device mounted on a car parked around. During actual implementation, an apparatus that can send a wireless signal may be built in an access card of the parking lot, and each access card has a specific signal identifier. When entering the parking lot, each owner takes one access card, and puts the access card in the car. In this case, the access card is equivalent to the searched terminal described in the foregoing embodiment.

2. The searching terminal turned on by the owner A may obtain, through scanning, a wireless signal sent by a scanned car and an identifier of the car. Optionally, when scanning an ambient wireless signal, the searching terminal may send an object searching request to a server of the parking lot, to request the server to send a location record set to the searching terminal.

3. The searching terminal searches, according to the identifier of the wireless signal obtained through scanning, the received location record set fed back by the server for a location record including the identifier of the wireless signal, extracts coordinates in the location record, and computes coordinates of the searching terminal by means of a centroid method or a weighted centroid method provided in the foregoing embodiments.

4. The location record set is searched, according to an identifier of a wireless signal sent by the car B, for a location record including the identifier of the wireless signal sent by the car B. The coordinates extracted from the location record are coordinates of the car B. During actual implementation, after parking the car, the owner scans the access card in the car using the searching terminal, to obtain an identifier of a wireless signal sent by the access card.

5. A navigation path may be computed according to the coordinates of the searching terminal and the coordinates of the car B such that the car B can be found quickly according to the navigation path.

The location record set in this embodiment is obtained using the location record sequence provided in the foregoing embodiments and a method for combining multiple location record sequences. Optionally, in a process in which the owner searches for the owner's car, the searching terminal may be used as a collection terminal and implements, on the background, the functions of the collection terminal described in the foregoing embodiments, to provide data for obtaining and updating of the location record set. Optionally, a robot that moves in the parking lot regularly and is equivalent to a collection terminal obtains and updates the location record set. For example, a track for the collection robot is deployed in the parking lot, and the robot moves in the parking lot along a preset track every a time period, to implement functions of the collection terminal.

In this embodiment of the present disclosure, a device that can transmit a wireless signal and is placed or installed on the car, a searching terminal (or a collection terminal onto which an object searching application is installed) carried by a searcher, and a collection terminal (a robot, or a searching terminal carried by a searcher) form an object searching system. A location relationship between cars parked in the parking lot is determined using wireless signals, and the location relationship is further converted into a location record set including coordinates and identifiers of wireless signals sent by the cars. Coordinates indicating the searching terminal and coordinates indicating a target searched car (that is, coordinates in a location record including an identifier of a wireless signal sent by the target searched car) are obtained based on the location record set. A navigation path is computed using the coordinates of the searching terminal and the coordinates of the target searched car such that the target searched car parked in the parking lot can be found quickly without deploying anchors whose locations are known, thereby reducing costs of deploying and maintaining devices whose locations are known.

In another actual application scenario, an embodiment of the present disclosure provides a method for searching for a container. Further, before being placed in a storage area of a harbor, each container is provided with a device that can transmit a wireless signal carrying an identifier. The identifier is used to identify a corresponding container. The device may be a wireless transceiver, an RF card, a BLUETOOTH device, an infrared device, or the like.

1. A worker moving in the storage area carries a terminal or a robot. The terminal or the robot carried by the worker may obtain, using the method for obtaining a location record sequence in the foregoing embodiments, a location record sequence used to represent a location relationship between detected containers placed in the storage area, and sends the location record sequence to a server disposed in the storage area.

2. The server obtains, based on the received location record sequence using the method for combining multiple location record sequences provided in the foregoing embodiments, a location record set indicating a relationship between containers in the entire storage area.

3. When started, a searching terminal carried by a searcher may scan, automatically or after being activated by the searcher, a wireless signal sent by a container around the storage area. The searcher carries a searching terminal. Optionally, the searching terminal may be any device that implements the functions of the searching terminal provided in the foregoing embodiments, or may be a collection terminal onto which an application implementing the functions of the searching terminal provided in the foregoing embodiments is installed, for example, a mobile phone.

4. The searching terminal sends an identifier and signal strength of the wireless signal obtained by scanning the ambient container to the server.

5. The server computes coordinates of the searching terminal by means of a centroid method or a weighted centroid method provided in the foregoing embodiments, and based on coordinates or coordinates and a signal in a location record that includes an identifier and that is found in the location record set according to the identifier of the wireless signal, obtains coordinates of a target searched container in the location record set according to an identifier that is of a wireless signal sent by the target searched container and that is sent by the searching terminal, computes a navigation path based on the coordinates of the searching terminal and the target searched container, and sends the navigation path to the searching terminal to search for the target searched container.

Certainly, step 4 and step 5 may be replaced with the following. The searching terminal does not send the identifier and the signal strength of the wireless signal obtained by scanning the ambient container to the server, but requests the server to send the stored location record set to the searching terminal, the searching terminal obtains the coordinates of the searching terminal and the coordinates of the target searched container according to the method for obtaining, by the server, the coordinates of the searching terminal and the coordinates of the target searched container, computes the navigation path based on the coordinates of the searching terminal and the coordinates of the target searched container, and searches for the target searched container according to the navigation path.

In this embodiment of the present disclosure, a location relationship between containers is converted into a location record set, coordinates of a searcher (a searching terminal) and coordinates of a target searched container are obtained in the location record set, and a navigation path is computed according to the coordinates such that the target searched container in the storage area can be found quickly without deploying anchors whose locations are known, thereby reducing costs of deploying and maintaining devices whose locations are known.

The object searching method may be also applied to a scenario of checking whether a facility or a device in a particular area deviates from a predetermined location. A mechanism is as follows. A location record set representing a location relationship between facilities or devices is irregularly updated. If the location record set is changed or updated, the mechanism may be used to determine whether the facility or the device deviates from the predetermined location such that it can be quickly checked, without deploying anchors whose locations are known, whether a facility or a device in a particular area deviates from a predetermined location, thereby reducing costs of deploying and maintaining devices whose locations are known.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A location relationship obtaining method, comprising:
   detecting, by a collection terminal when moving, wireless signals from ambient searched terminals;
   obtaining, by the collection terminal, at least two reference location points according to the wireless signals from the ambient searched terminals, wherein each of the reference location points is a location point for obtaining, by the collection terminal, a first wireless signal having greatest strength in a plurality of wireless signals from a corresponding searched terminal of the ambient searched terminals corresponding to the location point;
   setting, by the collection terminal, one of the at least two reference location points as a benchmark location point; and
   obtaining, by the collection terminal, a reference location relationship between another of the at least two reference location points and the benchmark location point, wherein the reference location relationship comprises a distance between the other of the at least two reference location points and the benchmark location point and an angle of orientation of the other of the at least two reference location points relative to the benchmark location point, and wherein the reference location relationship indicates a location relationship between a searched terminal of the ambient searched terminals corresponding to the other of the at least two reference location points and a searched terminal of the ambient searched terminals corresponding to the benchmark location point.

2. The location relationship obtaining method of claim 1, further comprising:
   setting, by the collection terminal, coordinates of the benchmark location point as initial coordinates;
   assigning, by the collection terminal, values to the initial coordinates;
   computing, by the collection terminal, coordinates of the other reference location points based on the reference location relationship and the initial coordinates;
   generating, by the collection terminal, a location record for one of the reference location points, wherein the location record comprises coordinates of the one of the reference location points and an identifier of a searched terminal of the ambient searched terminals corresponding to the one of the reference location points; and
   forming, by the collection terminal, a location record sequence using all obtained location records.

3. The location relationship obtaining method of claim 1, wherein detecting the wireless signals from the ambient searched terminals comprises:
   detecting a signal ratio of a second wireless signal received by the collection terminal, wherein a signal ratio of the first wireless signal from the searched terminal corresponding to the location point is greater than or equal to a preset signal ratio threshold;
   determining, by the collection terminal, whether the signal ratio of the second wireless signal is greater than or equal to the preset signal ratio threshold;
   determining, by the collection terminal, that the second wireless signal is the first wireless signal when the signal ratio of the second wireless signal is greater than or equal to the preset signal ratio threshold; and
   determining, by the collection terminal, that the second wireless signal is not the first wireless signal when the signal ratio of the second wireless signal is less than the preset signal ratio threshold.

4. A location relationship combining method, comprising:
   receiving at least two location record sequences from a collection terminal, wherein each of the location record sequences comprises at least two location records, wherein a location record of the at least two location records comprises coordinates of a reference location point and an identifier of a searched terminal of a plurality of searched terminals corresponding to the reference location point, and wherein the reference location point is a location point for obtaining a wireless signal having greatest strength from the searched terminal when the collection terminal moves; and combining the at least two location record sequences into a location record set in a coordinate system, wherein the location record set comprises coordinates of reference location points corresponding to the at least two location records in the coordinate system and identifiers of the searched terminals corresponding to the reference location points.

5. The location relationship obtaining method of claim 4, wherein combining the at least two location record sequences into the location record set comprises:
configuring the location record set;
initializing the location record set as an empty set;
adding location records in a first location record sequence to the location record set, wherein the first location record sequence is any received location record sequence;
performing a first determining process to determine whether a location record of at least one searched terminal of the searched terminals exists in both a next location record sequence and the location record set;
combining the next location record sequence with the location record set when the location record of the at least one searched terminal exists in both the next location record sequence and the location record set;
storing the next location record sequence into a temporary location record set when the location record of the at least one searched terminal does not exist in both the next location record sequence and the location record set;
repeating the first determining process until the first determining process is performed for all received location record sequences; and
obtaining the location record set.

6. The location relationship obtaining method of claim 5, further comprising updating the location record set, wherein updating the location record set comprises:
performing a second determining process to determine whether the location record of the at least one searched terminal exists in both a location record sequence in the temporary location record set and the location record set;
combining the location record sequence with the location record set when the location record of the at least one searched terminal exists in both the location record sequence and the location record set;
re-storing the location record sequence into the temporary location record set when the location record of the at least one searched terminal does not exist in both the location record sequence and the location record set;
repeating the second determining process until the second determining process is performed for all location record sequences in the temporary location record set; and
obtaining an updated location record set.

7. The location relationship obtaining method of claim 5, wherein combining the next location record sequence with the location record set comprises:
obtaining first coordinates according to coordinates corresponding to a first searched terminal of the at least one searched terminal in the next location record sequence and coordinates in the location record set, wherein the first searched terminal is a searched terminal whose location record exists in both the next location record sequence and the location record set;
generating a first location record for the first searched terminal, wherein the first location record comprises the first coordinates and an identifier of the first searched terminal;
obtaining second coordinates according to the first coordinates and coordinates corresponding to a first remaining searched terminal, wherein the first remaining searched terminal is a searched terminal other than the first searched terminal in searched terminals corresponding to the next location record sequence;
generating a second location record for the first remaining searched terminal, wherein the second location record comprises the second coordinates and an identifier of the first remaining searched terminal;
obtaining third coordinates according to the first coordinates and coordinates corresponding to a second remaining searched terminal, wherein the second remaining searched terminal is a searched terminal other than the first searched terminal in the location record set;
generating a third location record for the second remaining searched terminal, wherein the third location record comprises the third coordinates and an identifier of the second remaining searched terminal; and
replacing location records in the location record set with the first location record, the second location record, and the third location record.

8. The location relationship obtaining method of claim 6, wherein combining the location record sequence with the location record set comprises:
obtaining fourth coordinates according to coordinates corresponding to a second searched terminal in the location record sequence and coordinates in the location record set, wherein the second searched terminal is a searched terminal whose location record exists in both the location record sequence and the location record set;
generating a fourth location record for the second searched terminal, wherein the fourth location record comprises the fourth coordinates and an identifier of the second searched terminal;
obtaining fifth coordinates according to the fourth coordinates and coordinates corresponding to a third remaining searched terminal in the location record sequence, wherein the third remaining searched terminal is a searched terminal other than the second searched terminal in searched terminals corresponding to the next location record sequence;
generating a fifth location record for the third remaining searched terminal, wherein the fifth location record comprises the fifth coordinates and an identifier of the third remaining searched terminal;
obtaining sixth coordinates according to the fourth coordinates and coordinates corresponding to a fourth remaining searched terminal in the location record set, wherein the fourth remaining searched terminal is a searched terminal other than the second searched terminal in the location record set;
generating a sixth location record for the fourth remaining searched terminal, wherein the sixth location record comprises the sixth coordinates and an identifier of the fourth remaining searched terminal; and
replacing location records in the location record set with the generated fourth location record, the fifth location record, and the sixth location record.

9. An object searching method, comprising:
receiving an object searching request from a searching terminal for searching a target searched object, wherein the object searching request carries an identifier of the target searched object;
obtaining first coordinates of the searching terminal;

searching a location record set for a target location record according to the identifier of the target searched object;

obtaining second coordinates in the target location record, wherein the location record set comprises at least two location records, wherein a location record comprises third coordinates of a reference location point and an identifier of a searched object corresponding to the reference location point, wherein the reference location point is a location point for obtaining a first wireless signal having greatest strength from the searched object when a collection terminal moves, and wherein the target location record is a location record comprising the identifier of the target searched object;

computing a navigation path according to the first coordinates and the second coordinates; and sending the navigation path to the searching terminal.

10. The object searching method of claim 9, wherein obtaining the first coordinates of the searching terminal comprises:

searching the location record set for a reference location record;

obtaining fourth coordinates in the reference location record, wherein the reference location record comprises an identifier of the searched object detected when the searching terminal sends the object searching request; and computing the first coordinates according to the fourth coordinates.

11. The object searching method of claim 10, wherein an algorithm for computing the first coordinates according to the fourth coordinates comprises the first coordinates and the fourth coordinates, wherein the fourth coordinates are $(x_i, y_i)$, wherein the first coordinates are $$\left(\frac{\sum_{i=1}^{n} x_i}{n}, \frac{\sum_{i=1}^{n} y_i}{n}\right),$$

and wherein n is a quantity of reference location records.

12. The object searching method of claim 10, further comprising computing the first coordinates according to the fourth coordinates and strength of a second wireless signal from the searched terminal detected when the searching terminal sends the object searching request, wherein an algorithm comprises the first coordinates and the fourth coordinates, wherein the fourth coordinates are $(x_i, y_i)$, wherein the strength of the second wireless signal is $P_i$ (in decibel-milliwatts (dBm)), wherein the first coordinates of the searching terminal are $$\left(\frac{\sum_{i=1}^{n} \frac{x_i}{P_i}}{\sum_{i=1}^{n} P_i}, \frac{\sum_{i=1}^{n} \frac{y_i}{P_i}}{\sum_{i=1}^{n} P_i}\right),$$

and wherein n is a quantity of reference location records.

13. A collection terminal, comprising:

a processor;

a non-transitory computer-readable storage medium coupled to the processor and storing programming instructions for execution by the processor, wherein the programming instructions cause the processor to be configured to:

detect wireless signals from ambient searched terminals when the collection terminal moves;

obtain at least two reference location points according to the wireless signals from the ambient searched terminals, wherein each of the reference location points is a location point for obtaining, by the collection terminal, a first wireless signal having greatest strength in the wireless signals from a corresponding searched terminal of the ambient searched terminals corresponding to the location point;

set one of the at least two reference location points as a benchmark location point; and obtain a reference location relationship between another of the at least two reference location points and the benchmark location point, wherein the reference location relationship comprises a distance between the other of the at least two reference location points and the benchmark location point and an angle of orientation of the other of the at least two reference location points relative to the benchmark location point, and wherein the reference location relationship indicates a location relationship between a searched terminal of the ambient searched terminals corresponding to the other of the at least two reference location points and a searched terminal of the ambient searched terminals corresponding to the benchmark location point.

14. The collection terminal of claim 13, wherein the programming instructions further cause the processor to be configured to:

set coordinates of the benchmark location point as initial coordinates;

assign values to the initial coordinates;

compute coordinates of the other reference location points according to the reference location relationship and the initial coordinates;

generate a location record for one of the reference location points, wherein the location record comprises coordinates of the one of the reference location points and an identifier of a searched terminal of the ambient searched terminals corresponding to the one of the reference location points; and form a location record sequence using all location records.

15. The collection terminal of claim 13, wherein in a manner of detecting the wireless signals from the ambient searched terminals, the programming instructions further cause the processor to be configured to:

detect the wireless signals from the ambient searched terminals;

obtain identifiers of the ambient searched terminals and strength of the wireless signals; and determine whether a signal ratio of a second wireless signal of the wireless signals is greater than or equal to a preset signal ratio threshold, wherein the second wireless signal is the first wireless signal when the signal ratio of the first wireless signal is greater than or equal to the preset signal ratio threshold, and wherein the second wireless signal is not from the searched terminal when the signal ratio is less than the preset signal ratio threshold.

16. A device for combining location relationships, comprising:

a receiver configured to receive at least two location record sequences from a collection terminal, wherein each of the location record sequences comprises at least two location records, wherein a location record of the at least two location records comprises coordinates of a reference location point and an identifier of a searched terminal of a plurality of searched terminals corresponding to the reference location point, and wherein the reference location point is a location point for obtaining a wireless signal having greatest strength from the searched terminal when the collection terminal moves;

a non-transitory computer-readable storage medium coupled to the receiver and configured to store programming instructions; and a processor coupled to the non-transitory computer-readable storage medium, wherein the programming instructions cause the processor to be configured to combine the at least two location record sequences into a location record set in a coordinate system, and wherein the location record set comprises coordinates of reference location points corresponding to the at least two location records in the coordinate system and identifiers of the searched terminals corresponding to the reference location points.

17. The device of claim 16, wherein the programming instructions further cause the processor to be configured to:
configure the location record set;
initialize the location record set as an empty set;
add location records in a first location record sequence to the location record set, wherein the first location record sequence is any location record sequence received by the receiver;
perform a first determining process to determine whether a location record of at least one searched terminal of the searched terminals exists in both a next location record sequence and the location record set;
combine the next location record sequence with the location record set when the location record of the at least one searched terminal exists in both the next location record sequence and the location record set;
store the next location record sequence into a temporary location record set when the location record of the at least one searched terminal does not exist in both the next location record sequence and the location record set;
repeat the first determining process until the first determining process is performed for all location record sequences; and
obtain the location record set.

18. The device of claim 17, wherein the programming instructions further cause the processor to be configured to:
perform a second determining process to determine whether the location record of the at least one searched terminal exists in both a location record sequence stored in the temporary location record set and the location record set;
combine the location record sequence with the location record set when the location record of the at least one searched terminal exists in both the location record sequence stored in the temporary location record set and the location record set;
re-store the location record sequence into the temporary location record set when the location record of the at least one searched terminal does not exist in both the location record sequence stored in the temporary location record set and the location record set;
repeat the second determining process until the second determining process is performed for all location record sequences stored in the temporary location record set; and obtain an updated location record set.

19. The device of claim 17, wherein the programming instructions further cause the at least one processor to be configured to:
obtain first coordinates according to coordinates corresponding to a first searched terminal in the next location record sequence and coordinates in the location record set, wherein the first searched terminal is a searched terminal whose location record exists in both the next location record sequence and the location record set;
generate a first location record for the first searched terminal, wherein the first location record comprises the first coordinates and an identifier of the first searched terminal;
obtain second coordinates according to the first coordinates and coordinates corresponding to a first remaining searched terminal in the next location record sequence, wherein the first remaining searched terminal is a searched terminal other than the first searched terminal in searched terminals corresponding to the next location record sequence;
generate a second location record for the first remaining searched terminal, wherein the second location record comprises the second coordinates and an identifier of the first remaining searched terminal;
obtain third coordinates according to the first coordinates and coordinates corresponding to a second remaining searched terminal in the location record set, wherein the second remaining searched terminal is a searched terminal other than the first searched terminal in the location record set;
generate a third location record for the second remaining searched terminal, wherein the third location record comprises the third coordinates and an identifier of the second remaining searched terminal; and
replace location records in the location record set with the first location record, the second location record, and the third location record.

20. The device of claim 18, wherein the programming instructions further cause the at least one processor to be configured to:
obtain fourth coordinates according to coordinates corresponding to a second searched terminal in the location record sequence stored in the temporary location record set and coordinates in the location record set, wherein the second searched terminal is a searched terminal whose location record exists in both the location record sequence stored in the temporary location record set and the location record set;
generate a fourth location record for the second searched terminal, wherein the fourth location record comprises the fourth coordinates and an identifier of the second searched terminal;
obtain fifth coordinates according to the fourth coordinates and coordinates corresponding to a third remaining searched terminal in the location record sequence stored in the temporary location record set, wherein the third remaining searched terminal is a searched terminal other than the second searched terminal in searched terminals corresponding to the next location record sequence;
generate a fifth location record for the third remaining searched terminal, wherein the fifth location record comprises the fifth coordinates and an identifier of the third remaining searched terminal;

obtain sixth coordinates according to the fourth coordinates and coordinates corresponding to a fourth remaining searched terminal in the location record set, wherein the fourth remaining searched terminal comprises a searched terminal other than the second searched terminal in the location record set;

generate a sixth location record for the fourth remaining searched terminal, wherein the sixth location record comprises the sixth coordinates and an identifier of the fourth remaining searched terminal; and replace location records in the location record set with the fourth location record, wherein the fifth location record, and the sixth location record.

\* \* \* \* \*